(12) United States Patent
Abe

(10) Patent No.: US 8,155,019 B2
(45) Date of Patent: Apr. 10, 2012

(54) INFORMATION PROCESSING APPARATUS, DEVICE INFORMATION DISPLAY METHOD, AND COMPUTER-READABLE STORAGE MEDIUM

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 627 days.

(21) Appl. No.: 12/343,381

(22) Filed: Dec. 23, 2008

(65) Prior Publication Data

US 2009/0175200 A1 Jul. 9, 2009

(30) Foreign Application Priority Data

Jan. 7, 2008 (JP) .................................. 2008-000787
Dec. 3, 2008 (JP) .................................. 2008-308910

(51) Int. Cl.
*H04L 12/28* (2006.01)
(52) U.S. Cl. ........................................ 370/252; 370/254
(58) Field of Classification Search .................. None
See application file for complete search history.

(56) References Cited

U.S. PATENT DOCUMENTS

| 7,545,821 | B2 * | 6/2009 | Sonoda et al. | 370/401 |
|---|---|---|---|---|
| 7,634,680 | B2 * | 12/2009 | Shima | 714/4.1 |
| 7,756,955 | B2 * | 7/2010 | Takagi | 709/221 |
| 7,881,231 | B2 * | 2/2011 | Qian et al. | 370/255 |
| 2003/0194991 | A1 * | 10/2003 | Gilmour | 455/414.1 |
| 2006/0184510 | A1 * | 8/2006 | Nishio | 707/3 |
| 2006/0259646 | A1 * | 11/2006 | Lee et al. | 710/3 |
| 2006/0265473 | A1 * | 11/2006 | Muto | 709/218 |
| 2007/0086052 | A1 * | 4/2007 | Furuya | 358/1.15 |
| 2007/0088814 | A1 * | 4/2007 | Torii | 709/223 |
| 2008/0275994 | A1 * | 11/2008 | Wu | 709/228 |

OTHER PUBLICATIONS

UPnP™ Forum, "Printer:1 Device Template Version 1.01," retrieved at http://www.upnp.org/standardizeddcps/documents/Printer_Definition_v1_020808.pdf, published Aug. 8, 2002.
UPnP™ Forum, "PrintBasic:1 Service Template Version 1.01," retrieved at http://www.upnp.org/standardizeddcps/documents/Service_print_v1_020808.pdf, published Aug. 8, 2002.
Microsoft Corporation, "Web Services Dynamic Discovery (WS-Discovery)," retrieved at http://specs.xmlsoap.org/ws/2005/04/discovery/ws-discovery.pdf, published Apr. 2005.
Microsoft Corporation, "Devices Profile for Web Services," retrieved at http://specs.xmlsoap.org/ws/2006/02/devprof/devicesprofile.pdf, published Feb. 2006.

(Continued)

*Primary Examiner* — Hassan Phillips
*Assistant Examiner* — Duc Duong
(74) *Attorney, Agent, or Firm* — Carter, DeLuca, Farrell & Schmidt, LLP

(57) ABSTRACT

An information processing apparatus includes an obtaining unit configured to obtain pieces of identification information sent from devices mutually connected via a network, a determination unit configured to determine, in a case where the pieces of identification information which are obtained by the obtaining unit and sent by using mutually different protocols are identical with each other, that the devices which send the pieces of identification information are identical with each other, and a display unit configured to integrate information related to the devices determined to be identical with each other by the determination unit and display the information on a display apparatus.

11 Claims, 31 Drawing Sheets

OTHER PUBLICATIONS

W3C, "SOAP Version 1.2 Part 0: Primer (Second Edition)," retrieved at http://www.w3.org/TR/2007/REC-soap12-part0-20070427/, published Apr. 27, 2007.

W3C, "SOAP Version 1.2 Part 1: Messaging Framework (Second Edition)," retrieved at http://www.w3.org/TR/2007/REC-soap12-part1-20070427/, published Apr. 27, 2007.

W3C, "SOAP Version 1.2 Part 2: Adjuncts (Second Edition)," retrieved at http://www.w3.org/TR/2007/REC-soap12-part2-20070427/, published Apr. 27, 2007.

W3C, "SOAP Version 1.2 Specification Assertions and Test Collection (Second Edition)," retrieved at http://www.w3.org/TR/2007/REC-soap12-testcollection-20070427/, published Apr. 27, 2007.

* cited by examiner

```
<?xml version="1.0" ?>
<env:Envelope xmlns:env="http://www.w3.org/2003/05/soap-envelope"
    xmlns:wsa="http://schemas.xmlsoap.org/ws/2004/08/addressing"
    xmlns:disc="http://schemas.xmlsoap.org/ws/2005/04/discovery">
    <env:Header>
        <wsa:Action>http://schemas.xmlsoap.org/ws/2005/04/discovery/Hello</wsa:Action>
        <wsa:MessageID>%MESSAGE_ID%</wsa:MessageID>
        <wsa:To>%TO%</wsa:To>
        <disc:AppSequence InstanceId="%INSTANCE_ID%" />
    </env:Header>
    <env:Body>
        <disc:Hello>
            <wsa:EndpointReference>
                <wsa:Address>%ADDRESS%</wsa:Address>
            </wsa:EndpointReference>
            <disc:MetadataVersion>75965</disc:MetadataVersion>
        </disc:Hello>
    </env:Body>
</env:Envelope>
```

FIG. 9

```
<?xml version="1.0" ?>
<env:Envelope xmlns:env="http://www.w3.org/2003/05/soap-envelope"
  xmlns:wsa="http://schemas.xmlsoap.org/ws/2004/08/addressing"
  xmlns:disc="http://schemas.xmlsoap.org/ws/2005/04/discovery">
  <env:Header>
    <wsa:Action>http://schemas.xmlsoap.org/ws/2005/04/discovery/Bye</wsa:Action>
    <wsa:MessageID>%MESSAGE_ID%</wsa:MessageID>
    <wsa:To>%TO%</wsa:To>
    <disc:AppSequence InstanceId="%INSTANCE_ID%" />
  </env:Header>
  <env:Body>
    <disc:Bye>
      <wsa:EndpointReference>
        <wsa:Address>%ADDRESS%</wsa:Address>
      </wsa:EndpointReference>
    </disc:Bye>
  </env:Body>
</env:Envelope>
```

```
<?xml version="1.0" ?>
<env:Envelope xmlns:env="http://www.w3.org/2003/05/soap-envelope"
        xmlns:wsa="http://schemas.xmlsoap.org/ws/2004/08/addressing"
        xmlns:mex="http://schemas.xmlsoap.org/ws/2004/09/mex"
        xmlns:wsdp="http://schemas.xmlsoap.org/ws/2006/02/devprof"
        xmlns:disc="http://schemas.xmlsoap.org/ws/2005/04/discovery"
        xmlns:wprt="http://schemas.yyyy.xxx/YYYY/MM/wdp/print"
        xmlns:npnp="http://schemas.yyyy.xxx/npnp/YYYY/MM">                  ~78
    <env:Header>
        <wsa:Action>http://schemas.xmlsoap.org/ws/2004/09/transfer/GetResponse</wsa:Action>
        <wsa:MessageID>%MESSAGE_ID%</wsa:MessageID>
        <wsa:RelatesTo>%RELATES_TO%</wsa:RelatesTo>
        <wsa:To>%TO%</wsa:To>
    </env:Header>
    <env:Body>                                                              107
        <mex:Metadata>
            <mex:MetadataSection Dialect="http://schemas.xmlsoap.org/ws/2006/02/devprof/ThisDevice">
                <wsdp:ThisDevice>
                    <wsdp:FriendlyName xml:lang="en-US">ABC Kmmn</wsdp:FriendlyName>    ~48
                    <wsdp:FirmwareVersion>1.00</wsdp:FirmwareVersion>
                    <wsdp:SerialNumber>8888</wsdp:SerialNumber>
                    <npnp:UniqueId>aa:bb:cc:dd:ee:ff</npnp:UniqueId>                    ~73
                    <npnp:UseDeviceOnWindows>Available</npnp:UseDeviceOnWindows>        ~117
                </wsdp:ThisDevice>
            </mex:MetadataSection>
            <mex:MetadataSection Dialect="http://schemas.xmlsoap.org/ws/2006/02/devprof/ThisModel">
                <wsdp:ThisModel>
                    <wsdp:Manufacturer xml:lang="en-US">ABC</wsdp:Manufacturer>
                    <wsdp:ManufacturerUrl>http://www.abc.xxx</wsdp:ManufacturerUrl>
                    <wsdp:ModelName xml:lang="en-US">Kmmn</wsdp:ModelName>
                    <wsdp:ModelUrl>http://www.abc.xxx/kmmn.htm</wsdp:ModelUrl>
                    <wsdp:PresentationUrl>http://192.168.0.100:8000</wsdp:PresentationUrl>
                    <npnp:DeviceCategory>Printers</npnp:DeviceCategory>                 ~72
                </wsdp:ThisModel>
            </mex:MetadataSection>
            <mex:MetadataSection Dialect="http://schemas.xmlsoap.org/ws/2006/02/devprof/Relationship">
                <wsdp:Relationship Type="http://schemas.xmlsoap.org/ws/2006/02/devprof/host">
                    <wsdp:Hosted>
                        <wsa:EndpointReference>
                            <wsa:Address>http://192.168.0.100:4000/Printer</wsa:Address>
                        </wsa:EndpointReference>
                        <wsdp:Types>wprt:PrinterServiceType</wsdp:Types>
                        <wsdp:ServiceId>uri:schemas.abc.xxx/PrinterServiceId</wsdp:ServiceId>
                        <npnp:CompatibleId>
                            http://schemas.yyyy.xxx/YYYY/MM/wdp/print/PrinterServiceType   ~74
                        </npnp:CompatibleId>
                    </wsdp:Hosted>
                </wsdp:Relationship>
            </mex:MetadataSection>
        </mex:Metadata>
    </env:Body>
</env:Envelope>
```

FIG. 12

1: M-SEARCH * HTTP/1.1
2: HOST:239.255.255.250:1900
3: ST:upnp:rootdevice
4: MAN:"ssdp:discover"
5: MX:3

FIG. 13

1: NOTIFY * HTTP/1.1
2: HOST:239.255.255.250:1900
3: CHACHE-CONTROL:max-age=1800
4: LOCATION:http://192.168.0.100:3678/DDD/Printer.PrintKmmn.xml
5: NT:urn:schemas-upnp-org:device:Printer:1
6: NTS:ssdp:alive
7: SERVER:Kmmn-UPnP/1.0 UPnP-Device-Host/1.0
8: USN:uuid:00000000-0000-1000-8000-000000008888::urn:schemas-upnp-org:device:Printer:1

FIG. 14

```
<?xml version="1.0" ?>
<root xmlns="urn:schemas-upnp-org:device-1-0">
  <specVersion>
    <major>1</major>
    <minor>0</minor>
  </specVersion>
  <device>                                                                    123
    <npnp:X_deviceCategory xmlns:npnp="http://schemas.yyyy.xxx/npnp/YYYY/MM">
      Printers.Printer                                                  ---166
    </npnp:X_deviceCategory>
    <npnp:X_uniqueId xmlns:npnp="http://schemas.yyyy.xxx/npnp/YYYY/MM">
      aa:bb:cc:dd:ee:ff                                                 ---124
    </npnp:X_uniqueId>
    <npnp:X_useDeviceOnWindows xmlns:npnp="http://schemas.yyyy.xxx/npnp/YYYY/MM">
      Available                                                         ---116
    </npnp:X_useDeviceOnWindows>
    <deviceType>urn:schemas-upnp-org:device:Printer:1</deviceType>
    <friendlyName>ABC Kmmn</friendlyName>                               ---167
    <manufacturer>ABC</manufacturer>
    <manufacturerURL>http://www.abc.xxx</manufacturerURL>
    <modelDescription>UPnP Kmmn Printer Basic 1</modelDescription>
    <modelName>Kmmn</modelName>
    <modelNumber>1.0</modelNumber>
    <modelURL>http://www.abc.xxx/kmmn.htm</modelURL>
    <serialNumber>8888</serialNumber>
    <UDN>uuid:00000000-0000-1000-8000-000000008888</UDN>
    <serviceList>
      <service>
        <serviceType>urn:schemas-upnp-org:service:PrintBasic:1</serviceType>
        <serviceId>urn:upnp-org:serviceId:1</serviceId>
        <SCPDURL>http://192.168.0.100:3678/SCPD/PrintBasicKmmn.xml</SCPDURL>
        <controlURL>http://192.168.0.100:3678/upnp/control/PrintBasic</controlURL>
        <eventSubURL>http://192.168.0.100:3678/upnp/event/PrintBasic</eventSubURL>
      </service>
    </serviceList>
    <presentationURL>http://192.168.0.100:3678/upnp/presentation/index.html</presentationURL>
  </device>
</root>
```

FIG. 15

```
<?xml version="1.0" ?>
<env:Envelope xmlns:env="http://www.w3.org/2003/05/soap-envelope"
       xmlns:wsa="http://schemas.xmlsoap.org/ws/2004/08/addressing"
       xmlns:mex="http://schemas.xmlsoap.org/ws/2004/09/mex"
       xmlns:wsdp="http://schemas.xmlsoap.org/ws/2006/02/devprof"
       xmlns:disc="http://schemas.xmlsoap.org/ws/2005/04/discovery"
       xmlns:wprt="http://schemas.yyyy.xxx/YYYY/MM/wdp/print"
       xmlns:npnp="http://schemas.yyyy.xxx/npnp/YYYY/MM">
   <env:Header>
       <wsa:Action>http://schemas.xmlsoap.org/ws/2004/09/transfer/GetResponse</wsa:Action>
       <wsa:MessageID>%MESSAGE_ID%</wsa:MessageID>
       <wsa:RelatesTo>%RELATES_TO%</wsa:RelatesTo>
       <wsa:To>%TO%</wsa:To>
   </env:Header>
   <env:Body>                                                                           160
       <mex:Metadata>
           <mex:MetadataSection Dialect="http://schemas.xmlsoap.org/ws/2006/02/devprof/ThisDevice">
               <wsdp:ThisDevice>
                   <wsdp:FriendlyName xml:lang="en-US">DEF Misachan</wsdp:FriendlyName>
                   <wsdp:FirmwareVersion>2.00</wsdp:FirmwareVersion>
                   <wsdp:SerialNumber>1111</wsdp:SerialNumber>
                   <npnp:UniqueId>gg:hh:ii:jj:kk:ll</npnp:UniqueId>            ----161
                   <npnp:UseDeviceOnWindows>Available</npnp:UseDeviceOnWindows> ----162
               </wsdp:ThisDevice>
           </mex:MetadataSection>
           <mex:MetadataSection Dialect="http://schemas.xmlsoap.org/ws/2006/02/devprof/ThisModel">
               <wsdp:ThisModel>
                   <wsdp:Manufacturer xml:lang="en-US">DEF</wsdp:Manufacturer>
                   <wsdp:ManufacturerUrl>http://www.def.xxx</wsdp:ManufacturerUrl>
                   <wsdp:ModelName xml:lang="en-US">Misachan</wsdp:ModelName>
                   <wsdp:ModelUrl>http://www.def.xxx/misachan.htm</wsdp:ModelUrl>
                   <wsdp:PresentationUrl>http://192.168.0.102:8000</wsdp:PresentationUrl>
                   <npnp:DeviceCategory>Printers</npnp:DeviceCategory>          ----163
               </wsdp:ThisModel>
           </mex:MetadataSection>
           <mex:MetadataSection Dialect="http://schemas.xmlsoap.org/ws/2006/02/devprof/Relationship">
               <wsdp:Relationship Type="http://schemas.xmlsoap.org/ws/2006/02/devprof/host">
                   <wsdp:Hosted>
                       <wsa:EndpointReference>
                           <wsa:Address>http://192.168.0.102:4000/Printer</wsa:Address>
                       </wsa:EndpointReference>
                       <wsdp:Types>wprt:PrinterServiceType</wsdp:Types>
                       <wsdp:ServiceId>uri:schemas.def.xxx/PrinterServiceId</wsdp:ServiceId>
                       <npnp:CompatibleId>
                           http://schemas.yyyy.xxx/YYYY/MM/wdp/print/PrinterServiceType  ----164
                       </npnp:CompatibleId>
                   </wsdp:Hosted>
               </wsdp:Relationship>
           </mex:MetadataSection>
       </mex:Metadata>
   </env:Body>
</env:Envelope>
```

FIG. 16

```
<?xml version="1.0" ?>
<root xmlns="urn:schemas-upnp-org:device-1-0">
  <specVersion>
    <major>1</major>
    <minor>0</minor>
  </specVersion>
  <device>
    <npnp:X_deviceCategory xmlns:npnp="http://schemas.yyyy.xxx/npnp/YYYY/MM">
      Printers.Printer
    </npnp:X_deviceCategory>
    <npnp:X_uniqueId xmlns:npnp="http://schemas.yyyy.xxx/npnp/YYYY/MM">
      mm:nn:oo:pp:qq:rr
    </npnp:X_uniqueId>
    <npnp:X_useDeviceOnWindows xmlns:npnp="http://schemas.yyyy.xxx/npnp/YYYY/MM">
      Available
    </npnp:X_useDeviceOnWindows>
    <deviceType>urn:schemas-upnp-org:device:Printer:1</deviceType>
    <friendlyName>DEF Natchan</friendlyName>
    <manufacturer>DEF</manufacturer>
    <manufacturerURL>http://www.def.xxx</manufacturerURL>
    <modelDescription>UPnP Natchan Printer Basic 1</modelDescription>
    <modelName>Natchan</modelName>
    <modelNumber>2.0</modelNumber>
    <modelURL>http://www.def.xxx/natchan.htm</modelURL>
    <serialNumber>2222</serialNumber>
    <UDN>uuid:00000000-0000-1000-8000-000000002222</UDN>
    <serviceList>
      <service>
        <serviceType>urn:schemas-upnp-org:service:PrintBasic:1</serviceType>
        <serviceId>urn:upnp-org:serviceId:1</serviceId>
        <SCPDURL>http://192.168.0.103:3678/SCPD/PrintBasicNatchan.xml</SCPDURL>
        <controlURL>http://192.168.0.103:3678/upnp/control/PrintBasic</controlURL>
        <eventSubURL>http://192.168.0.103:3678/upnp/event/PrintBasic</eventSubURL>
      </service>
    </serviceList>
    <presentationURL>http://192.168.0.103:3678/upnp/presentation/index.html</presentationURL>
  </device>
</root>
```

167 — X_deviceCategory block
168 — device block
170 — X_uniqueId block
171 — X_useDeviceOnWindows block

FIG. 17

```
<?xml version="1.0" ?>
<env:Envelope xmlns:env="http://www.w3.org/2003/05/soap-envelope"
      xmlns:wsa="http://schemas.xmlsoap.org/ws/2004/08/addressing"
      xmlns:mex="http://schemas.xmlsoap.org/ws/2004/09/mex"
      xmlns:wsdp="http://schemas.xmlsoap.org/ws/2006/02/devprof"
      xmlns:disc="http://schemas.xmlsoap.org/ws/2005/04/discovery"
      xmlns:wprt="http://schemas.yyyy.xxx/YYYY/MM/wdp/print"
      xmlns:npnp="http://schemas.yyyy.xxx/npnp/YYYY/MM">
  <env:Header>
      <wsa:Action>http://schemas.xmlsoap.org/ws/2004/09/transfer/GetResponse</wsa:Action>
      <wsa:MessageID>%MESSAGE_ID%</wsa:MessageID>
      <wsa:RelatesTo>%RELATES_TO%</wsa:RelatesTo>
      <wsa:To>%TO%</wsa:To>
  </env:Header>
  <env:Body>                                                                              119
      <mex:Metadata>
          <mex:MetadataSection Dialect="http://schemas.xmlsoap.org/ws/2006/02/devprof/ThisDevice">
              <wsdp:ThisDevice>
                  <wsdp:FriendlyName xml:lang="en-US">ABC Xyz WSD</wsdp:FriendlyName>     ---120
                  <wsdp:FirmwareVersion>1.02</wsdp:FirmwareVersion>
                  <wsdp:SerialNumber>777</wsdp:SerialNumber>
              </wsdp:ThisDevice>
          </mex:MetadataSection>
          <mex:MetadataSection Dialect="http://schemas.xmlsoap.org/ws/2006/02/devprof/ThisModel">
              <wsdp:ThisModel>
                  <wsdp:Manufacturer xml:lang="en-US">ABC</wsdp:Manufacturer>
                  <wsdp:ManufacturerUrl>http://www.abc.xxx</wsdp:ManufacturerUrl>
                  <wsdp:ModelName xml:lang="en-US">Xyz</wsdp:ModelName>
                  <wsdp:ModelUrl>http://www.abc.xxx/xyz.htm</wsdp:ModelUrl>
                  <wsdp:PresentationUrl>http://192.168.0.101:8000</wsdp:PresentationUrl>
                  <npnp:DeviceCategory>Printers</npnp:DeviceCategory>
              </wsdp:ThisModel>
          </mex:MetadataSection>
          <mex:MetadataSection Dialect="http://schemas.xmlsoap.org/ws/2006/02/devprof/Relationship">
              <wsdp:Relationship Type="http://schemas.xmlsoap.org/ws/2006/02/devprof/host">
                  <wsdp:Hosted>
                      <wsa:EndpointReference>
                          <wsa:Address>http://192.168.0.101:4000/Printer</wsa:Address>
                      </wsa:EndpointReference>
                      <wsdp:Types>wprt:PrinterServiceType</wsdp:Types>
                      <wsdp:ServiceId>uri:schemas.abc.xxx/PrinterServiceId</wsdp:ServiceId>
                      <npnp:CompatibleId>
                          http://schemas.yyyy.xxx/YYYY/MM/wdp/print/PrinterServiceType
                      </npnp:CompatibleId>
                  </wsdp:Hosted>
              </wsdp:Relationship>
          </mex:MetadataSection>
      </mex:Metadata>
  </env:Body>
</env:Envelope>
```

FIG. 18

```
<?xml version="1.0" ?>
<root xmlns="urn:schemas-upnp-org:device-1-0">
  <specVersion>
    <major>1</major>
    <minor>0</minor>
  </specVersion>
                                                                          121
  <device>
    <npnp:X_deviceCategory xmlns:npnp="http://schemas.yyyy.xxx/npnp/YYYY/MM">
      Printers.Printer
    </npnp:X_deviceCategory>
    <deviceType>urn:schemas-upnp-org:device:Printer:1</deviceType>
    <friendlyName>ABC Xyz_UPnP</friendlyName>                    ~122
    <manufacturer>ABC</manufacturer>
    <manufacturerURL>http://www.abc.xxx</manufacturerURL>
    <modelDescription>UPnP Kmmn Printer Basic 1</modelDescription>
    <modelName>Xyz</modelName>
    <modelNumber>1.0</modelNumber>
    <modelURL>http://www.abc.xxx/xyz.htm</modelURL>
    <serialNumber>777</serialNumber>
    <UDN>uuid:00000000-0000-1000-8000-000000000777</UDN>
    <serviceList>
      <service>
        <serviceType>urn:schemas-upnp-org:service:PrintBasic:1</serviceType>
        <serviceId>urn:upnp-org:serviceId:1</serviceId>
        <SCPDURL>http://192.168.0.101:3678/SCPD/PrintBasicKmmn.xml</SCPDURL>
        <controlURL>http://192.168.0.101:3678/upnp/control/PrintBasic</controlURL>
        <eventSubURL>http://192.168.0.101:3678/upnp/event/PrintBasic</eventSubURL>
      </service>
    </serviceList>
    <presentationURL>http://192.168.0.101:3678/upnp/presentation/index.html</presentationURL>
  </device>
</root>
```

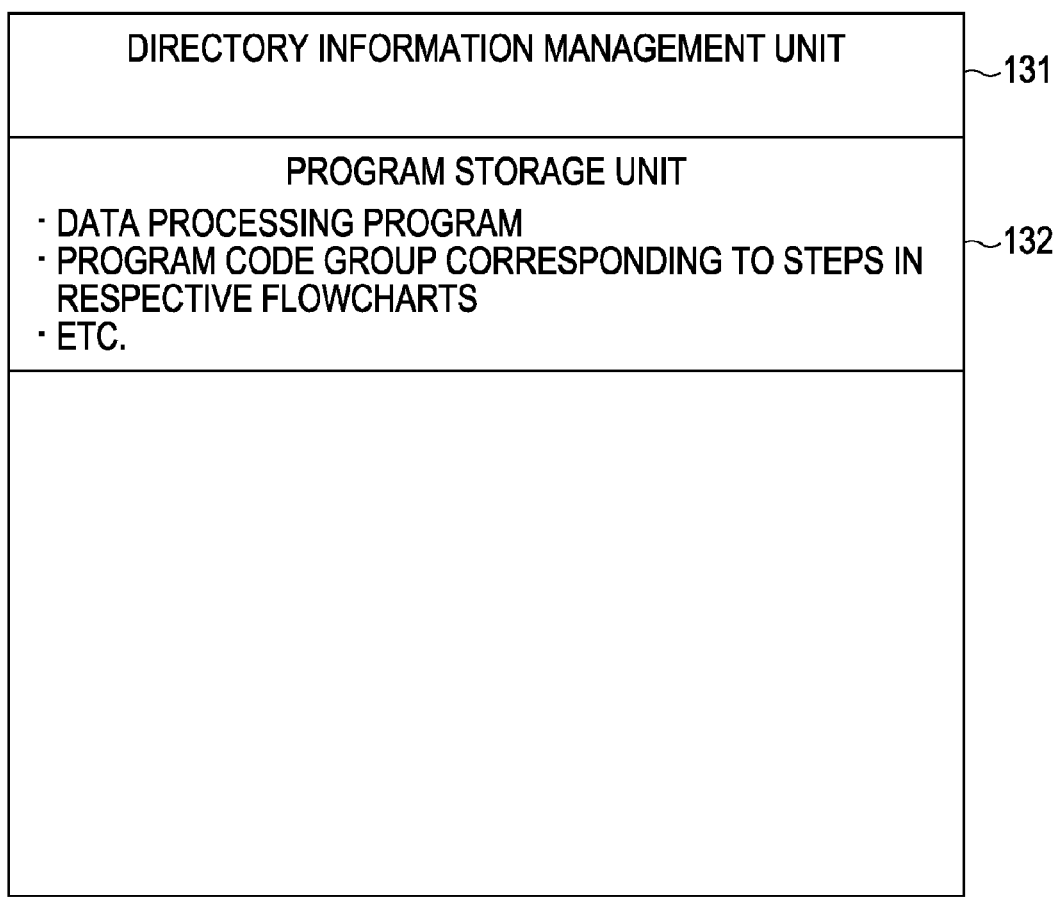

INFORMATION PROCESSING APPARATUS, DEVICE INFORMATION DISPLAY METHOD, AND COMPUTER-READABLE STORAGE MEDIUM

BACKGROUND OF THE INVENTION

1. Field of the Invention

The present invention relates to an information processing apparatus, a device information display method, and a computer-readable storage medium. In particular, the invention relates to an information processing apparatus, a device information display method, and a computer-readable storage medium, which are suitably used for displaying information related to a device corresponding to a plurality of protocols on an information processing apparatus side.

2. Description of the Related Art

In recent years, with a development of a network infrastructure, a network-based printer, a copier, a facsimile, a scanner, a digital camera, and an apparatus provided with these multiple functions (peripheral apparatuses) are being rapidly spread. Along with this, setting up for such a network-based peripheral apparatus, that is, user operations for installing a driver for the peripheral apparatus into an information processing apparatus and internal controls are devised in various manners.

As the network-based peripheral apparatuses become widely used, a technology is being developed of searching for a peripheral apparatus which provides various services via a network and controlling the peripheral apparatus from an information processing apparatus such as a personal computer (client terminal apparatus). As such a technology, for example, UPnP (Universal Plug and Play) exists, which is standardized by UPnP Forum (http://www.upnp.org/). In addition, as a similar technology, Devices Profile for web Services exists, specifications of which are disclosed at W3C (http://www.w3.org/) on the internet. Furthermore, as a technology similar to this Devices Profile for web Services, WSD (web Services on Devices) also exists.

As the technology related to these fields, a technology described in US 2006/0184510 (corresponding to Japanese Patent Laid-Open No. 2004-334751) exists.

SUMMARY OF THE INVENTION

The present invention provides, for example, an information processing apparatus, including an obtaining unit configured to obtain pieces of identification information sent from devices mutually connected via a network; a determination unit configured to determine, in a case where the pieces of identification information which are obtained by the obtaining unit and sent by using mutually different protocols are identical with each other, that the devices which send the pieces of identification information are identical with each other; and a display unit configured to integrate information related to the devices determined to be identical with each other by the determination unit and display the information on a display apparatus.

Other features and advantageous of the present invention will be apparent from the following description taken in conjunction with the accompanying drawings, in which like reference characters designate the same or similar parts throughout there of.

BRIEF DESCRIPTION OF THE DRAWINGS

FIG. 9 illustrates an example of a Hello message of WS-Discovery according to the first exemplary embodiment of the present invention.

FIG. 10 illustrates an example of a Bye message of WS-Discovery according to the first exemplary embodiment of the present invention.

FIG. 11 illustrates an example of WSD-based N-PnP information according to the first exemplary embodiment of the present invention.

FIG. 12 illustrates an example of an HTTP request according to the first exemplary embodiment of the present invention.

FIG. 13 illustrates an example of an HTTP response according to the first exemplary embodiment of the present invention.

FIG. 14 illustrates an example of UPnP-based N-PnP information according to the first exemplary embodiment of the present invention.

FIG. 15 illustrates an example of the WSD-based N-PnP information according to the first exemplary embodiment of the present invention.

FIG. 16 illustrates an example of the UPnP-based N-PnP information according to the first exemplary embodiment of the present invention.

FIG. 17 illustrates an example of the WSD-based N-PnP information according to the first exemplary embodiment of the present invention.

FIG. 18 illustrates an example of the UPnP-based N-PnP information according to the first exemplary embodiment of the present invention.

FIG. 32 illustrates an example of a memory map of a storage medium storing various data processing programs which can be read by the peripheral apparatus control system according to the second exemplary embodiment of the present invention.

DESCRIPTION OF THE EMBODIMENTS

Figure 1:
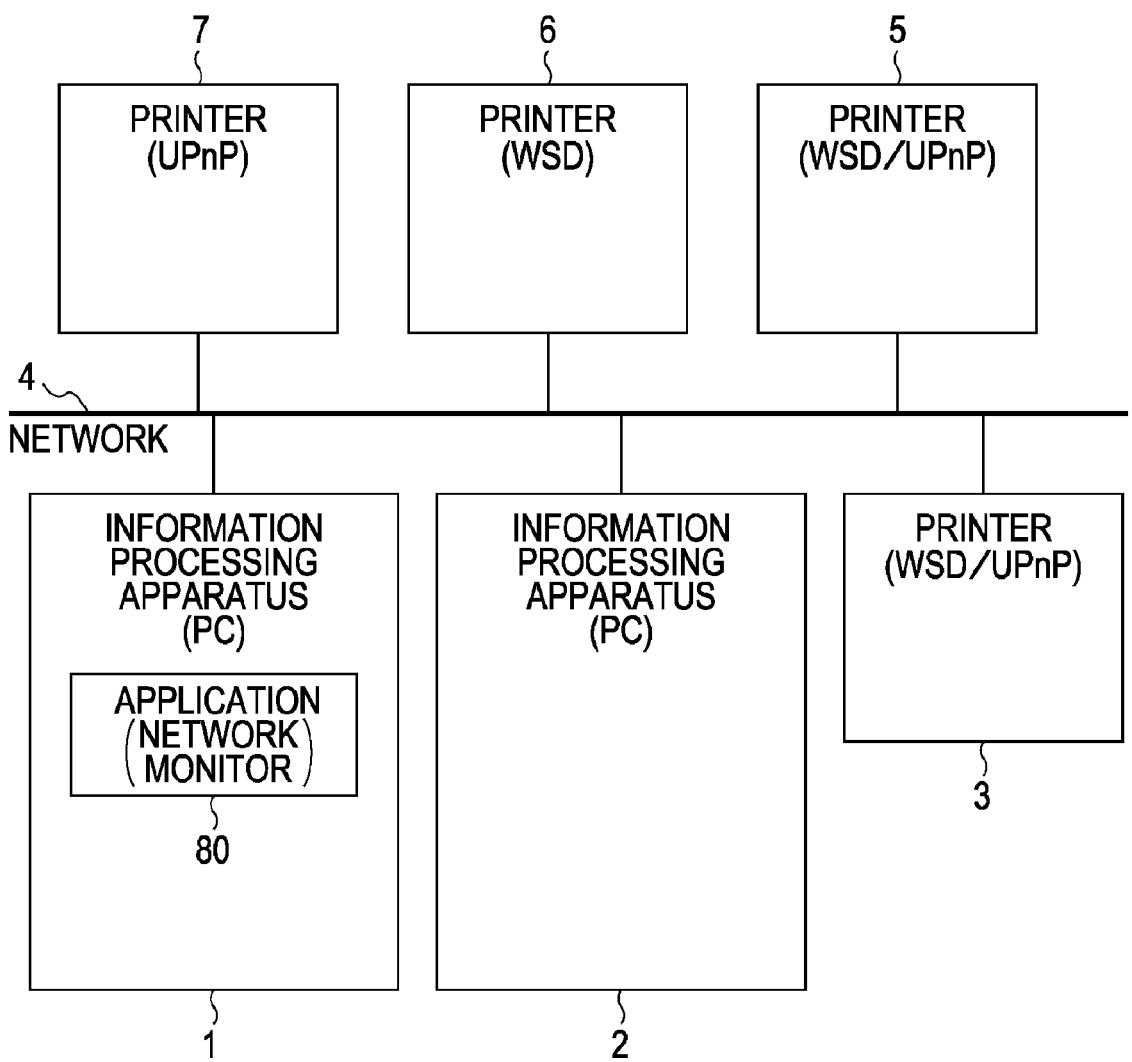
FIG. 1 is a block diagram of a configuration example of a peripheral apparatus control system according to a first exemplary embodiment of the present invention.

First, premises for exemplary embodiments of the present invention will be described. Herein, a case is considered in which Microsoft® Windows Vista® is installed as an OS (Operating System) into an information processing apparatus. Also, an MFP (Multi Function Peripheral) in which a network-based color inkjet printer and a flat bed scanner are integrated with each other is considered as a peripheral apparatus. For example, this peripheral apparatus is presumed to be provided with two different WSD-based services including a print service and a scan service of WSD. In a case where the information processing apparatus in which Windows Vista® is installed and the peripheral apparatus are mutually connected via a network, on the OS, when a network folder is opened, an icon representing the peripheral apparatus is displayed as one device. This display mechanism is based on functions of WSD which is mounted as a default in Windows Vista® and Plug and Play Extensions (PnP-X), and the following control is performed.

Step A-1: The information processing apparatus is connected to a network via a network cable, and the information processing apparatus is activated.

Step A-2: The peripheral apparatus is connected to the network via the network cable, and a power source of the peripheral apparatus is turned ON.

Step A-3: The peripheral apparatus sends a Hello message of WS-Discovery to the information processing apparatus to notify that the peripheral apparatus is connected to the network.

Step A-4: In response to the request from the information processing apparatus, the peripheral apparatus sends detailed information of the peripheral apparatus in a metadata element format of SOAP (Simple Object Access Protocol) to the information processing apparatus.

Step A-5: The information processing apparatus (the OS (Windows Vista®)) obtains information regulated by WSD and PnP-X in the detailed information.

Step A-6: The network folder in the OS checks the presence or absence of the WSD device on the network.

Step A-7: The network folder obtains information related to the services (in this example, the print service and the scan service of WSD) from the information obtained in step A-5.

Step A-8: The network folder recognizes that this peripheral apparatus is one WSD-compatible device provided with the two services including the print service and the scan service of WSD.

Step A-9: The network folder displays this peripheral apparatus as the one WSD-compatible device.

In this manner, for example, the peripheral apparatus provided with the plurality of services regulated by the one protocol, which is WSD, is displayed in the network folder on the OS (Windows Vista®) as the one WSD-compatible device. Therefore, it is possible for the user to recognize that the one peripheral apparatus is connected on the network.

It is noted that Plug and Play Extensions (PnP-X) may be regarded as the series of extension functions of Plug and Play which provide a support for a network connection device.

The peripheral apparatus is presumed to be provided with print services of WSD and UPnP and two different protocols. In this case, after the processing in the above-described steps A-1 and A-2 is executed, as another processing independent from the processing in the above-described steps A-3 to A-9, the following processing is executed.

Step B-1: The information processing apparatus sends an SSDP (Simple Service Discovery Protocol) request to the peripheral apparatus.

Step B-2: After the peripheral apparatus receives the SSDP request in step B-1, an SSDP response is sent to the information processing apparatus.

Step B-3: In response to the request from the information processing apparatus, the peripheral apparatus sends the detailed information of the peripheral apparatus in a format of a device element of UPnP to the information processing apparatus.

Step B-4: The information processing apparatus (the OS (Windows Vista®)) obtains information regulated by UPnP and PnP-X in this detailed information.

Step B-5: The network folder in the OS checks the presence or absence of the UPnP device on the network.

Step B-6: The network folder obtains information related to the service (in this example, the print service of UPnP) from the detailed information obtained in step B-4.

Step B-7: The network folder recognizes that the peripheral apparatus which sends the detailed information is one UPnP-compatible device provided with the print service of UPnP.

Step B-8: The network folder displays the peripheral apparatus which sends the detailed information as one UPnP-compatible device.

In this manner, in a case where the peripheral apparatus is provided, for example, with the plurality of different protocols such as WSD and UPnP, the processing in the above-described steps A-3 to A-9 and the processing in the above-described steps B-1 to B-8 are independently executed. As a result, in the network folder on the OS (Windows Vista®), the one WSD-compatible device and the one the UPnP-compatible device are both displayed as total two devices. That is, such a problem occurs that even when the one peripheral apparatus is connected to the network, display is performed in the network folder on the OS (Windows Vista®) as if two peripheral apparatuses are connected to the network. For example, there is a problem that the WSD device and the UPnP device are displayed as two mutually independent devices on a network monitor in a mode of two icons corresponding to the respective devices. With this configuration, the user may have such misunderstanding that two peripheral apparatuses are connected to the network.

Hereinafter, a first exemplary embodiment of the present invention will be described with reference with the drawings. It is noted that in the following description, information regarding SOAP (Simple Object Access Protocol) is already disclosed on the internet at W3C, and therefore a description thereof will be omitted. Also, information which will be cited below regarding a part to which no detailed description is provided in information of the OS (Windows Vista®) is already disclosed in a site of Microsoft Developer Network (MSDN). Thus, a detailed description thereof will be omitted.

FIG. 1 is a block diagram of a configuration example of a peripheral apparatus control system provided with information processing apparatuses and peripheral apparatuses.

In FIG. 1, information processing apparatuses 1 and 2 are composed of general personal computers (hereinafter, which may be abbreviated as PC. The PCs 1 and 2 are composed by including hardware which will be described below with reference to FIG. 2 and in which an OS equivalent to Microsoft® Windows Vista® as an OS (Operating System) is presumed to be installed. The PCs 1 and 2 are connected to a network 4 composed, for example, of Ethernet.

Printers 3, 5, 6, and 7 are color inkjet printers, which are one of examples of the peripheral apparatus (device). The printer 3 is provided with a novel function which is newly proposed herein, and is composed of a printer supporting WSD and UPnP with a model name of Kmmn made by ABC Company. The printer 5 is a related art printer provided with no novel function which is newly proposed herein, and is composed of a printer supporting WSD and UPnP with a model name of Xyz made by ABC Company. The printer 6 is provided with the novel function which is newly proposed herein, and is composed of a printer supporting WSD with model name of Misachan made by DEF Company. The printer 7 is provided with the novel function which is newly proposed herein, and is composed of a printer supporting UPnP with model name of Natchan made by DEF Company. It is noted that the peripheral apparatus (device) is not limited to the printer, but may also be a printer, a copier, a facsimile, a scanner, a digital camera, an apparatus provided with these multiple functions, and the like. It is noted that the above-described company names (ABC Company and DEF Company) and the model names (Kmmn, Xyz, Misachan, and Natchan) are made-up names.

Figure 6:
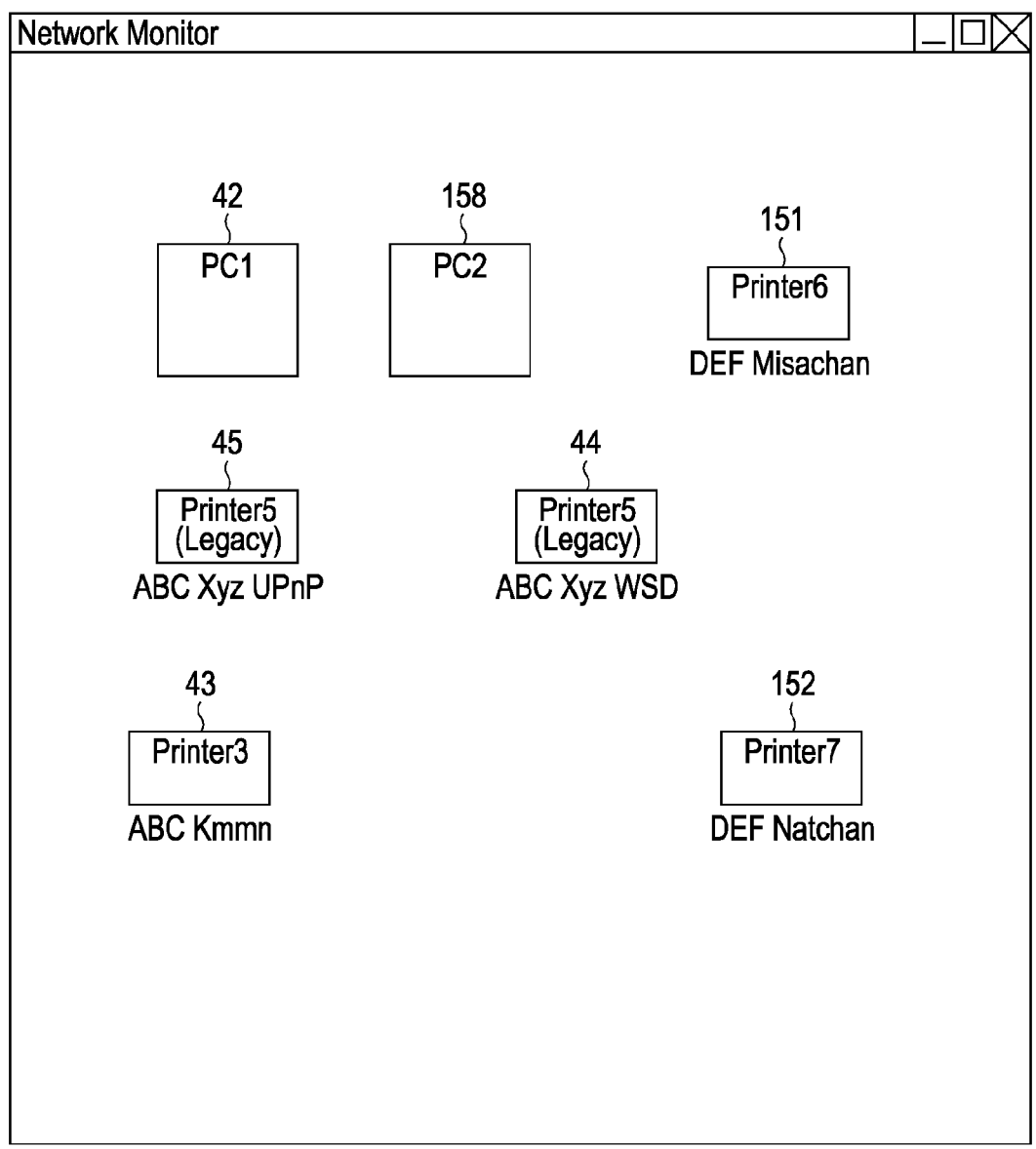
FIG. 6 illustrates a first example of a screen displayed by a network monitor according to the first exemplary embodiment of the present invention.

The printers 3, 5, 6, and 7 are composed by including hardware which will be described below with reference to FIG. 3, and are mutually connected to the PCs 1 and 2 via the network 4. The information processing apparatuses 1 and 2 and the printers 3, 5, 6, and 7 can mutually perform a bi-directional communication. An application (application program) 80 is composed of a file (*.EXE) in an executable format for Windows®. Herein, the network monitor (Network Monitor) for displaying a screen shown in FIG. 6 is represented as the application 80 as an example.

Figure 2:
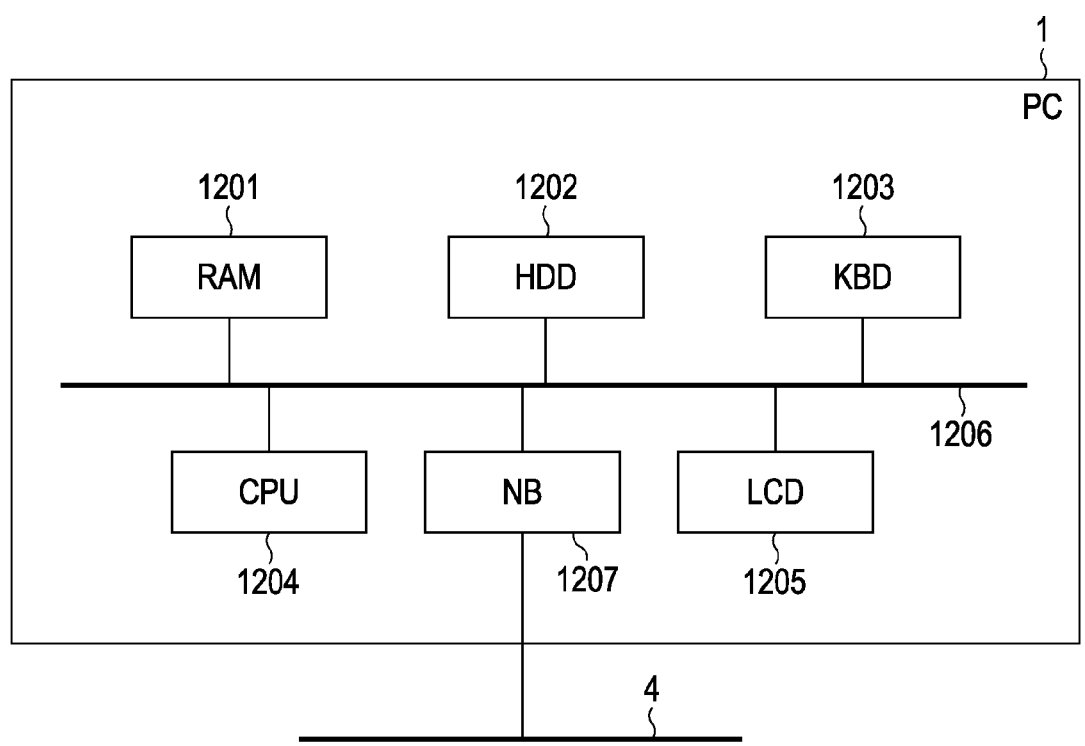
FIG. 2 is a block diagram of a hardware configuration example of a PC according to the first exemplary embodiment of the present invention.

FIG. 2 is a block diagram of a hardware configuration example of the PCs 1 and 2. It is noted that hardware configurations of the PCs 1 and 2 are the same, and only the PC 1 will be described below, and a description of the PC 2 will be omitted.

Figure 4:
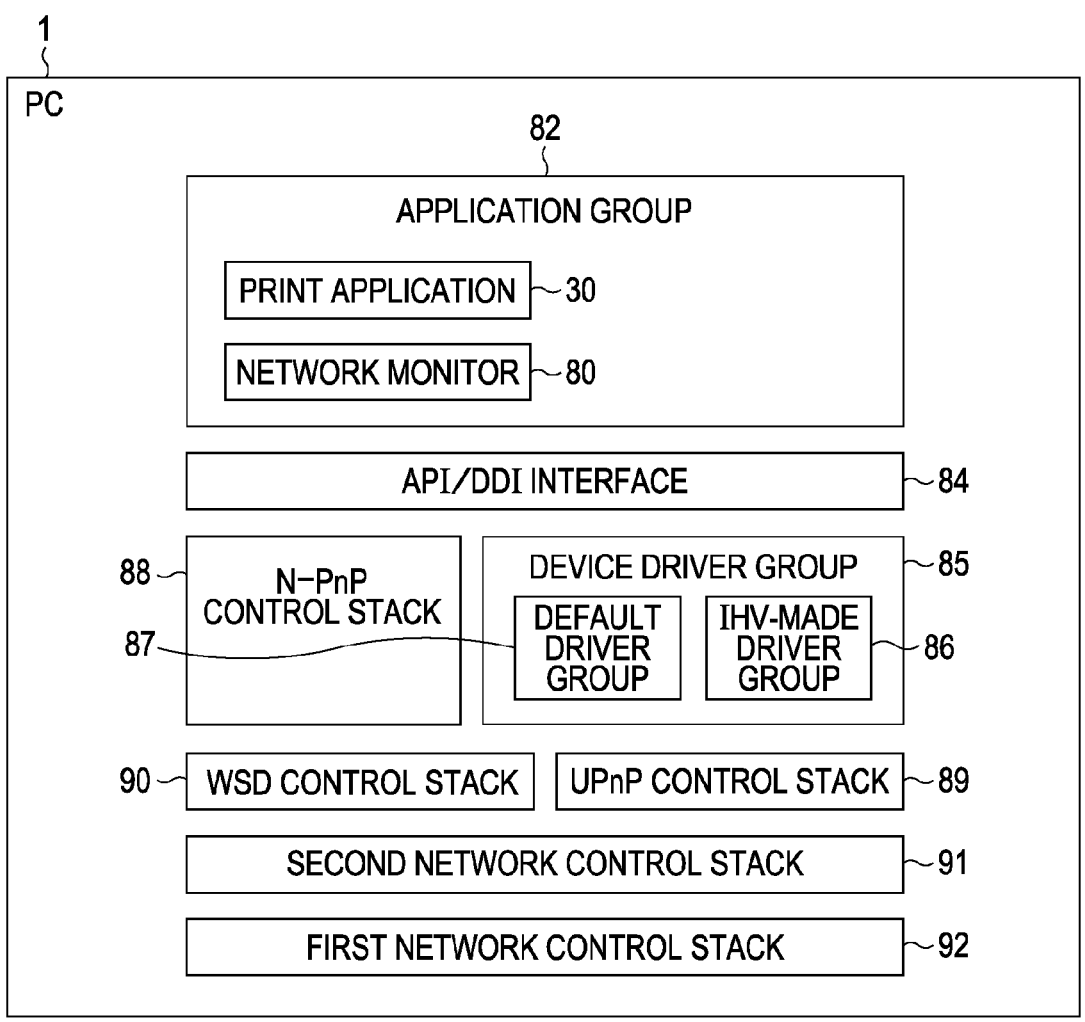
FIG. 4 illustrates a software configuration example of the PC according to the first exemplary embodiment of the present invention.
Figure 5:
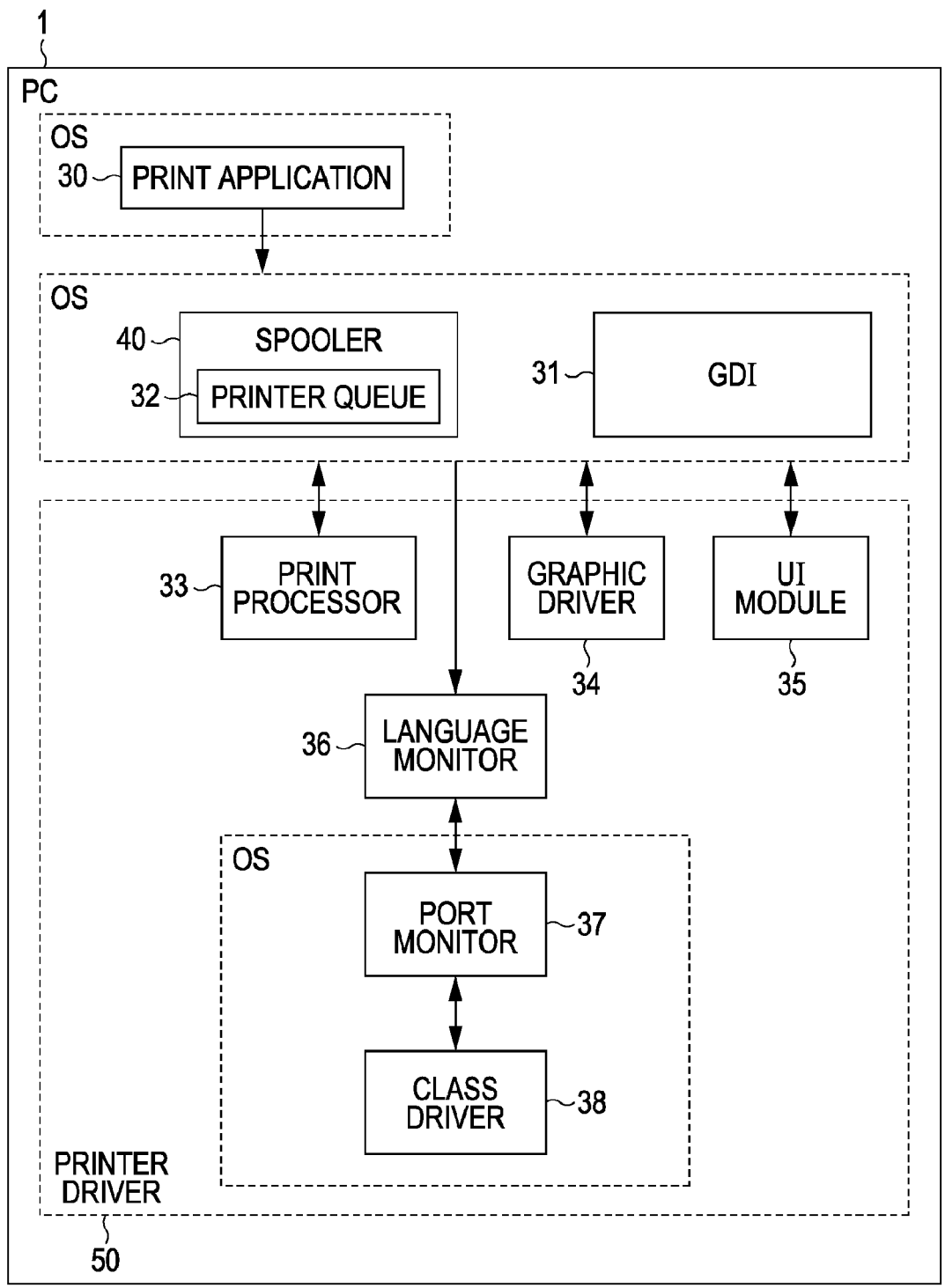
FIG. 5 illustrates a configuration example of a printer driver in the PC according to the first exemplary embodiment of the present invention.

As illustrated in FIG. 2, the PC 1 is provided with a random access memory unit (a RAM 1201), a hard disk drive functioning as a storage unit (an HDD 1202), a keyboard unit which is an example of an input unit (a KBD 1203), and a control unit (a CPU 1204). Furthermore, the PC 1 is provided with a display for displaying which is an example of a display unit (a LCD 1205), a network board which is an example of a communication control unit (an NB 1207), and a bus for mutually connecting the above-described components of the PCs 1 and 2 (address bus/data bus) 1206. It is noted that the storage unit may be composed of a portable CD-ROM, a ROM which is internally installed, or the like. The respective modules (software) shown in FIGS. 4 and 5 are stored in the HDD 1202, read out by the RAM 1201 as occasion demands, and executed by the CPU 1204. With this configuration, the CPU 1204 realizes functions of the respective modules (software) shown in FIGS. 4 and 5.

Figure 3:
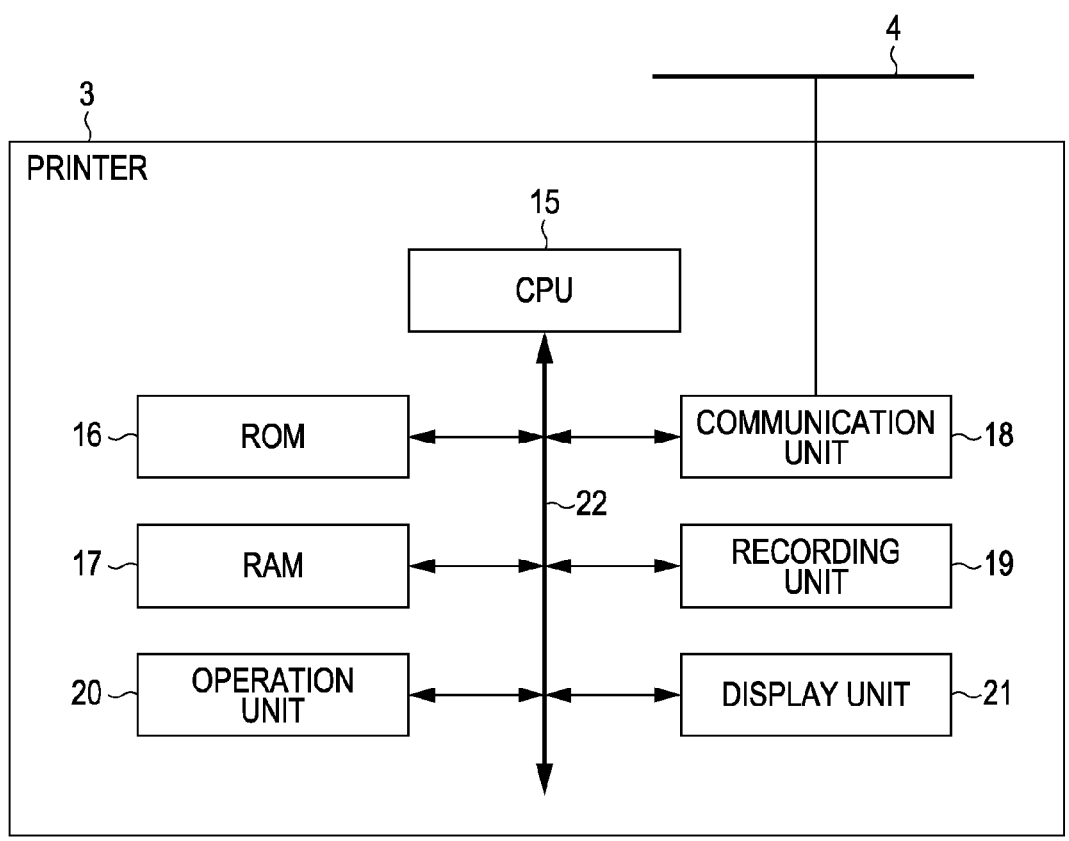
FIG. 3 is a block diagram of a hardware configuration example of a printer according to the first exemplary embodiment of the present invention.

FIG. 3 is a block diagram of a hardware configuration example of the printers 3, 5, 6, and 7. It is noted that hardware configurations of the printers 3, 5, 6, and 7 are the same, and therefore only the printer 3 will be described below, and a description of the printers 5, 6, and 7 will be omitted.

In FIG. 3, a CPU 15 is composed of a micro processor and the like. As a central processing apparatus of the printer 3, while following a program stored in a ROM 16, a RAM 17, the CPU 15 controls a communication unit 18, a recording unit 19, and the like. The ROM 16 stores a program for the printer 3 to perform a processing of recording (printing), a program for performing a processing of informing the PC 1 of a state, and the like while following a control of a printer driver 50 which will be described in FIG. 5. The RAM 17 temporarily stores printing data mainly sent from the PC 1. The recording unit 19 performs the printing based on this printing data.

The communication unit 18 includes a connection port for the network 4 and controls a communication of the network 4 (Ethernet). The recording unit 19 is constructed by including a recording unit composed of an inkjet system recording head, respective color ink, a carriage, a recording sheet conveyance mechanism, and the like, and an electric circuit composed of ASIC or the like for generating printing pulses at the recording unit on the basis of the printing data.

Through a print operation on a printable application, a display content (image data) of a file opened on the application is temporarily stored in the HDD 1202 of the PC 1 as a spool file in a device-independent data format. The image data is converted into printing data including a printer control command via the printer driver 50 and then sent to the printer 3 via the network 4.

The printing data received by the printer 3 is converted into printing pulses by the recording unit 19 and printed on the recording sheet. The operation unit 20 is composed of various buttons such as a power source button and a reset button. The user can operate the printer 3 by using the operation unit 20. The display unit 21 is composed of a liquid crystal display of a touch panel, with which it is possible to perform display of a state of the printer 3, display of various settings, input, and the like.

It is noted that the components shown in FIG. 3 are mutually connected via the bus (address bus/data bus) 22.

FIG. 4 illustrates a software configuration example of the PC 1.

In FIG. 4, a first network control stack 92 controls the network (Ethernet). A second network control stack 91 controls the IP Network. A WSD control stack 90 controls the WSD. The UPnP control stack 89 controls the UPnP. An N-PnP control stack 88 controls Plug and Play of the network (hereinafter, which may be abbreviated as N-PnP). It is noted that as a function mounted as a default in the OS (Windows Vista®) which provides a support to the network connection device as the series of extension functions of Plug and Play, the following function exists, that is, Plug and Play Extensions (PnP-X). However, according to the present embodiment, the description is provided while taking a case as an example where the above-described N-PnP is utilized as the function equivalent to PnP-X.

A device driver group 85 has a default driver group 87 supplied with the OS (Windows Vista®) as a default and an IHV-made driver group 86 provided from IHV (Independent Hardware Vendors). An API/DDI interface 84 has API (Application Programming Interface) and DDI (Device Driver Interface). The network monitor 80 which is an application program is supplied with the OS (Windows Vista®) as a default. The print application 30 which is an application program is an application capable of executing a print as will be described in FIG. 5. An application group 82 has the network monitor 80, a print application 30, and the like.

An event of WS-Discovery which will be described below with reference to FIGS. 9 and 10 is notified to the network monitor 80 via the API/DDI interface 84. The network monitor 80 can obtain the detailed information of the printer 3 included in an SOAP metadata element 107 which will be described below with reference to FIG. 11 and the detailed information of the printer 5 included in an SOAP metadata element 119 which will be described below with reference to FIG. 25 via the API/DDI interface 84. Also, the network monitor 80 can also obtain the detailed information of the printer 3 included in a UPnP device element 123 which will be described below with reference to FIG. 14 and the detailed information of the printer 5 included in a UPnP device element 124 which will be described below with reference to FIG. 26 via the API/DDI interface 84. The network monitor 80 can install the printer driver 50 for the printer 3 via the API/DDI interface 84 into the PC 1 and delete (uninstall) the printer driver from the PC 1. The network monitor 80 can display the following icons and menus which will be described below with reference to FIGS. 6 to 8 via the API/DDI interface 84.

That is, the network monitor 80 can display icons 42 to 45, 151, 152, 158, a web page link menu 46, a UPnP print menu 47, an install menu 51, and a webpage link menu 52. Also, the network monitor 80 can display a WSD property display menu 53, an uninstall menu 79, an install menu 125, a webpage link menu 126, a WSD property display menu 127, and a UPnP print menu 128. Also, the network monitor 80 can display an uninstall menu 129, an install menu 153, a web page link menu 154, and a WSD property display menu 155. Furthermore, the network monitor 80 can display a web page link menu 156, a UPnP print menu 157, and an uninstall menu 159.

It is noted that in FIG. 4, the IHV-made driver group 86 is an IHV-made module, and other modules are modules supplied with the OS as a default.

FIG. 5 illustrates a print driver configuration example in the PC 1.

In FIG. 5, the printer driver 50 is a printer driver for the printer 3 which is installed into the PC 1 and has a plurality of modules 33 to 38. The print application 30 can execute the printing which is, for example, equivalent to Notepad (Notepad.exe) functioning as a text editor supplied with the OS (Windows Vista®) as a default. A GDI (Graphics Device Interface) 31 is a part of the OS (Windows Vista®). A printer queue 32 is composed as a part of a spooler 40. A print job is put in a queue at the printer queue 32. The queuing print job is displayed in a printer queue folder (a description of which is omitted herein).

The print processor 33 is used for changing a print layout and performing a special processing on a print image. The graphics driver 34 is configured to perform an image processing for the printing on the basis of a drawing command sent from the GDI 31 as a core of the image processing of the printer driver 50 and create a print control command. The UI module 35 is configured to provide and control a user interface of the printer driver 50. The language monitor 36 is configured to control data transmission as a communication I/F for the data. The port monitor 37 is configured to perform a processing of sending the data sent from the language monitor 36 to an appropriate port and a processing of receiving the data sent from the printer 3 via the class driver 38. The class driver 38 is a low level module closest to the port. According to the present embodiment, the class driver 38 is equivalent to a driver of a printer class of WSD and UPnP, and controls a port (for example, a network port). The printer driver 50 is of ABC Company which is the manufacturer of the printer 3.

FIG. 6 illustrates a first example of a screen displayed by the network monitor 80.

As illustrated in FIG. 6, on the screen displayed by the network monitor 80, icons of the PCs 1 and 2 and the peripheral apparatuses 3, 5, 6, and 7 existing on the network 4 and the like are displayed. The network monitor 80 is supplied with the OS as a default.

In FIG. 6, an icon 42 is an icon representing the PC 1. An icon 158 is an icon representing the PC 2. An icon 43 is an icon representing the printer 3. Icons 44 and 45 are icons representing the printer 5. Herein, the icon 44 represents the printer 5 as a printer corresponding to WSD, and the icon 45 represents the printer 5 corresponding to UPnP, but in actuality, the printers are the identical device (the printer 5). An icon 151 is an icon representing the printer 6. An icon 152 is an icon representing the printer 7.

It is noted that the peripheral apparatuses displayed by the network monitor 80 are not necessarily in a usable state after the printer driver 50 is installed to the PC 1. The peripheral apparatuses include, for example, one in the usable state after the install of the printer driver 50 is completed and one not in the usable state as the printer driver 50 is not installed.

Figure 7:
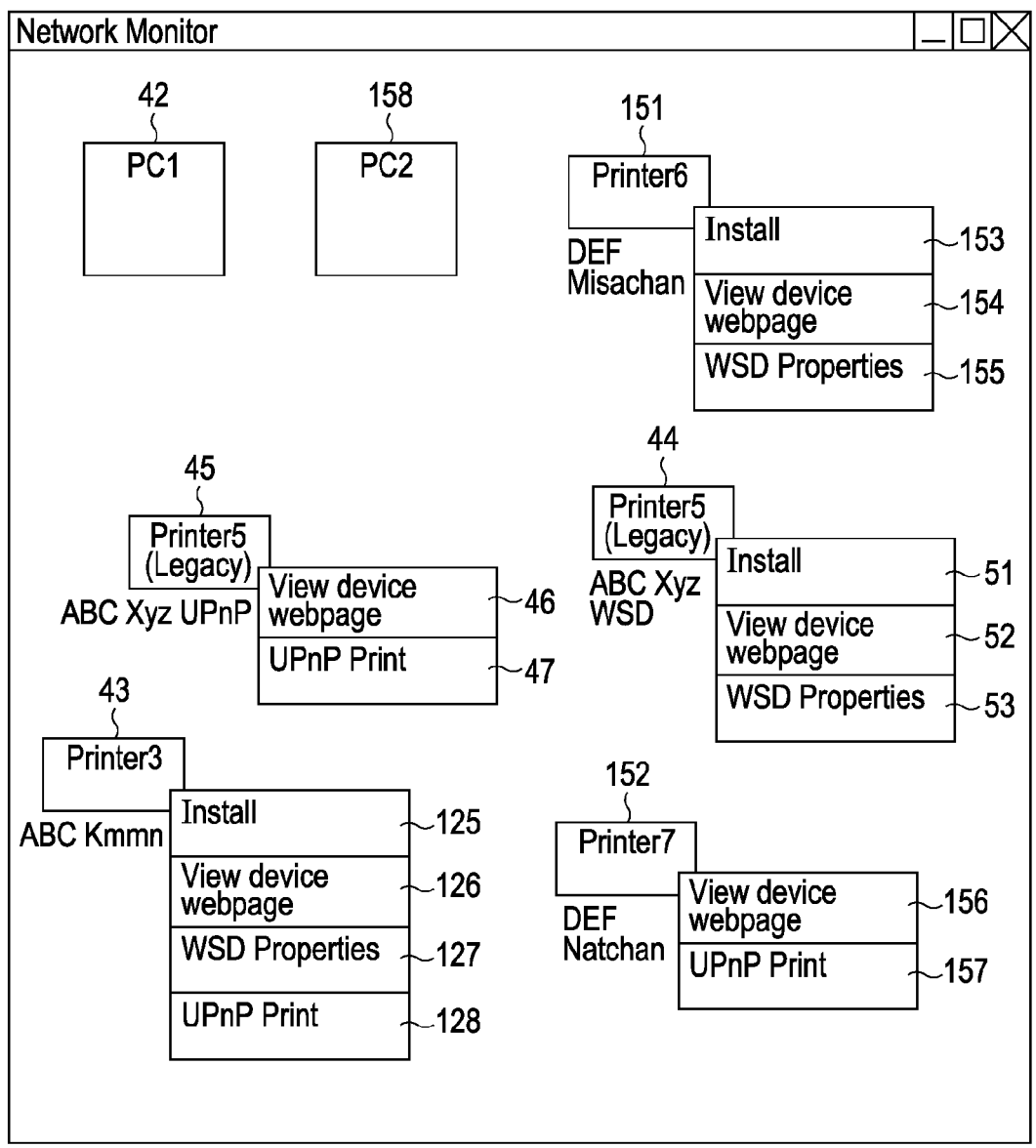
FIG. 7 illustrates a second example of the screen displayed by the network monitor according to the first exemplary embodiment of the present invention.

FIG. 7 illustrates a second example of the screen displayed by the network monitor 80.

In FIG. 7, when the user selects the icon 43 representing the printer by using the mouse through the manual operation and then performs the right click, the menus 125, 126, 127, and 128 which are examples of the operation menus are displayed. In a case where the install menu 125 is selected, the install of the printer 3, that is, the printer driver 50 for the printer 3 is installed into the PC 1. When the install of the printer driver 50 for the printer 3 is completed, as will be described with reference to FIG. 8, the uninstall menu 129 is displayed, and the install menu 125 is not displayed. Then, a printer icon 94 representing that the printer 3 is in the usable state is displayed in a printer folder 93 which will be described below with reference to FIG. 19, thus establishing a state where the printing can be performed by using the printer 3.

In a case where the webpage link menu 126 is selected, a link to a URL (http://www.abc.xxx/kmmn.htm) specified by a <wsdp:ModelUrl> element of FIG. 11 or a <modelURL> element of FIG. 14 is performed. Then, the web page related to the peripheral apparatus is opened and displayed. In the case of this example, the web page of the printer 3 (this web page will be described below with reference to FIG. 22) is opened and displayed. In a case where the WSD property display menu 127 is selected, a link to a URL (http://192.168.0.100:8000) specified by a <wsdp:PresentationUrl> element of FIG. 11 is performed. Then, a root page of the web server for WSD in the printer 3 (this root page will be described below with reference to FIG. 16) is opened, and a setting screen of the printer is displayed. In a case where the UPnP print menu 128 is selected, a link to a URL (http://192.168.0.100:3678/upnp/presentation/index.html) specified by a <presentationURL> element of FIG. 14 is performed. Then, a root page of the web server for UPnP in the printer 3 (this root page will be described below with reference to FIG. 21) is opened, and the print setting screen for the UPnP Print is displayed.

When the user selects the icon 44 representing the printer 5 by using the mouse through the manual operation and then performs the right click, menus 51, 52, and 53 which are examples of the operation menus are displayed. In a case where the install menu 51 is selected, the install of the printer 5, that is, the printer driver for the printer 5 is installed into the PC 1. When the install of the printer driver 50 for the printer 5 is completed, as will be described below with reference to FIG. 8, the uninstall menu 79 is displayed, and the install menu 51 is not displayed. Then, a printer icon 95 represents a state where the printer 5 can be utilized is displayed in the printer folder 93 which will be described below with reference to FIG. 19, and a state where the printing can be performed by using the printer 5 is established.

In a case where the webpage link menu 52 is selected, a link to URL (http://www.abc.xxx/xyz.htm) specified by a <wsdp:ModelUrl> element of FIG. 17 is performed. Then, the web page related to the peripheral apparatus is opened and displayed. In the case of this example, the web page of the printer 5 is opened and displayed. In a case where the WSD property display menu 53 is selected, a link to a URL (http://192.168.0.101:8000) specified by a <wsdp:PresentationUrl> element of FIG. 17 is performed. Then, a root page of the web server for WSD in the printer 5 is opened, and the setting screen of the printer is displayed.

When the user selects the icon 43 representing the printer 3 by using the mouse through the manual operation and then selects and performs the right click on the icon 45 representing the printer 5 by using the mouse, the menus 46 and 47 are displayed. In a case where the web page link menu 46 is selected, a link to URL (http://www.abc.xxx/xyz.htm) specified by <modelUrl> element of FIG. 18 is performed. Then, the web page related to the peripheral apparatus is opened and displayed. In the case of this example, the web page of the printer 5 is opened and displayed. In a case where the UPnP print menu 47 is selected, a link to a URL (http://192.168.0.101:3678:upnp/presentation/index.html) specified by <presentationURL> element of FIG. 18 is performed. Then, the root page of the web server for UPnP in the printer 5 is opened, and the print setting screen for the UPnP Print is displayed.

When the user selects the icon 43 representing the printer 3 by using the mouse through the manual operation and then selects and performs the right click on the icon 151 representing the printer 6 by using the mouse, menus 153, 154, and 155 which are examples of the operation menus are displayed. In a case where the install menu 153 is selected, the install of the printer 6, that is, the printer driver for the printer 6 is installed into the PC 1. When the install of the printer 6 is completed, as will be described below with reference to FIG. 8, the uninstall menu 159 is displayed, and the install menu 153 is not displayed. Then, a printer icon 165 representing a state where the printer 6 can be utilized is displayed in the printer folder 93 which will be described below with reference to FIG. 19, and a state where the printing can be performed by using the printer 6 is established.

In a case where the web page link menu 154 is selected, a link to a URL (http://www.def.xxx/misachan.htm) specified by a <wsdp:ModelUrl> element of FIG. 15 is performed. Then, the web page related to the peripheral apparatus is opened and displayed. In the case of this example, the web page of the printer 6 is opened and displayed. In a case where the WSD property display menu 155 is selected, a link to a URL (http://192.168.0.102:8000) specified by a <wsdp:PresentationUrl> element of FIG. 15 is performed. Then, a root page of the web server for WSD in the printer 6 is opened, and the setting screen of the printer is displayed.

When the user selects the icon 152 representing the printer 7 by using the mouse through the manual operation and then performs the right click, menus 156 and 157 which are examples of the operation menus are displayed. In a case where the web page link menu 156 is selected, a link to a URL (http://www.def.xxx/natchan.htm) specified by a <modelUrl> element of FIG. 16 is performed. Then, the web page related to the peripheral apparatus is opened and displayed. In the case of this example, the web page of the printer 7 is opened and displayed. In a case where the UPnP print menu 157 is selected, a link to a URL (http://192.168.0.103:3678:upnp/presentation/index.html) specified by a <presentationURL> element of FIG. 16 is performed. Then, the root page of the web server for UPnP in the printer 7 is opened, and the print setting screen for the UPnP Print is displayed.

Figure 8:
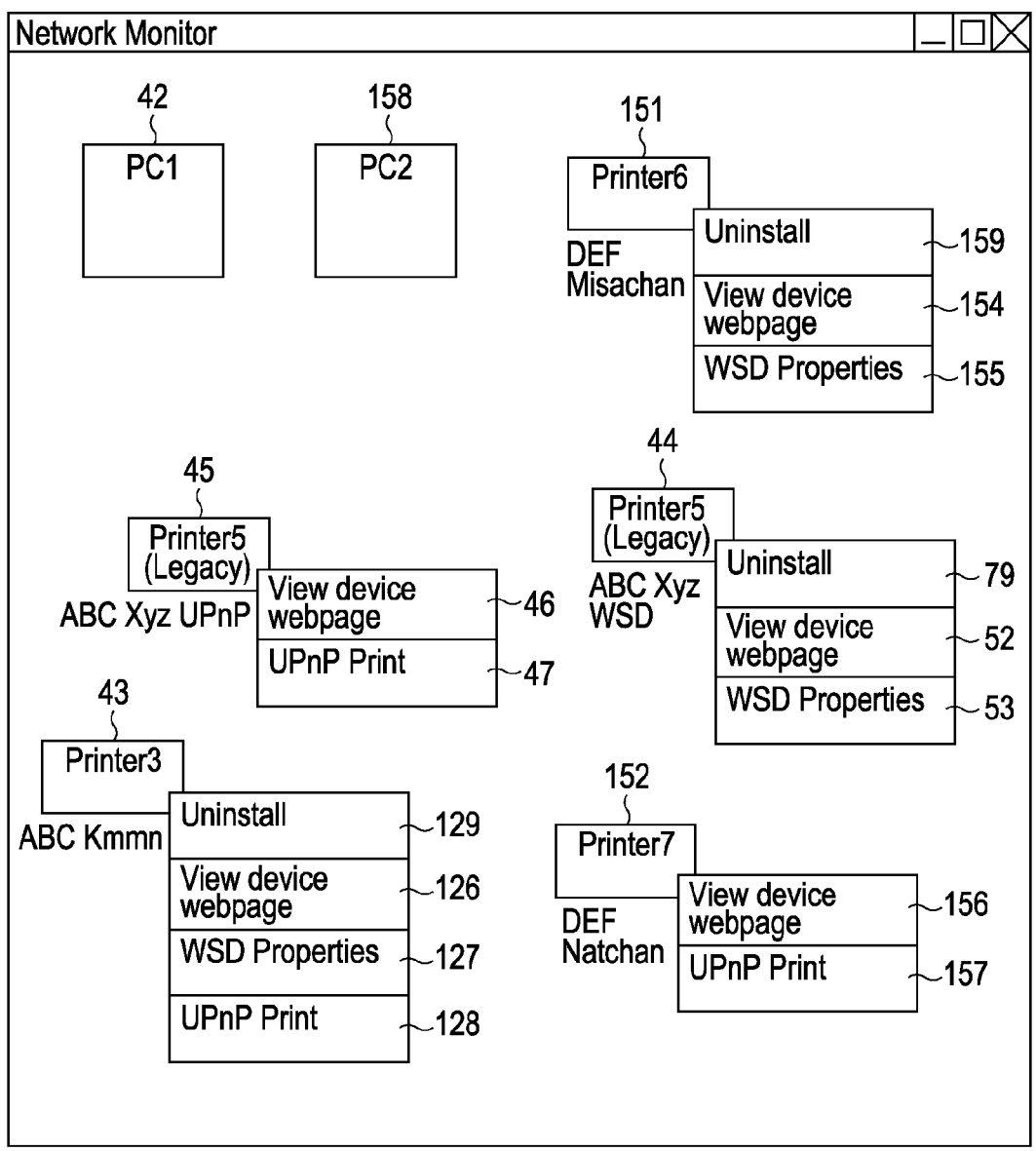
FIG. 8 illustrates a third example of the screen displayed by the network monitor according to the first exemplary embodiment of the present invention.

FIG. 8 illustrates a third example of the screen displayed by the network monitor 80.

In FIG. 8, when the user selects the icon 43 representing the printer by using the mouse through the manual operation and then performs the right click, menus 129, 126, 127, and 128 which are examples of the operation menus are displayed. The menus 126, 127, and 128 are the same as those illustrated in FIG. 7. In a case where the uninstall menu 129 is selected, the uninstall of the printer 3, that is, the printer driver 50 for the printer 3 is uninstalled from the PC 1. When the uninstall of the printer 3 is completed, the install menu 125 is displayed, and the uninstall menu 129 is not displayed. Then, the printer icon 94 is deleted from the printer folder 93 which will be described below with reference to FIG. 19 and disappears.

When the user selects the icon 44 representing the printer 5 by using the mouse and then performs the right click, menus 79, 52, and 53 which are examples of the operation menus are displayed. The menus 52 and 53 are the same as those illustrated in FIG. 7.

In a case where the uninstall menu 79 is selected, the uninstall of the printer 5, that is, the printer driver for the printer 5 is uninstalled from the PC 1. When the uninstall of the printer 5 is completed, the install menu 51 is displayed, and the uninstall menu 79 is not displayed. Then, the printer icon 95 is deleted from the printer folder 93 which will be described below with reference to FIG. 19 and disappears.

When the user selects the icon 45 representing the printer 5 by using the mouse and then performs the right click, the menus 46 and 47 which are examples of the operation menus are displayed. The menus 46 and 47 are the same as those illustrated in FIG. 7.

When the user selects the icon 151 representing the printer 6 by using the mouse and then performs the right click, menus 159, 154, and 155 which are examples of the operation menus are displayed. The menus 154 and 155 are the same as those illustrated in FIG. 7. In a case where the uninstall menu 159 is selected, the uninstall of the printer 6, that is, the printer driver for the printer 6 is uninstalled from the PC 1. When the uninstall of the printer 6 is completed, the install menu 153 is displayed, and the uninstall menu 159 is not displayed. Then, the printer icon 165 is deleted from the printer folder 93 which will be described below with reference to FIG. 19 and disappears.

When the user selects the icon 152 representing the printer 7 by using the mouse and then performs the right click, menus 156 and 157 which are examples of the operation menus are displayed. The menus 156 and 157 are the same as those illustrated in FIG. 7.

FIG. 9 illustrates an example of a Hello message of WS-Discovery.

When the printer 3 is connected to the network 4 in a state where the power source of the printer 3 is turned ON, this Hello message is sent to from the printer 3 to the PCs 1 and 2 and the other peripheral apparatuses 5 to 7 which are connected to the network 4. With this configuration, the PCs 1 and 2 and the other peripheral apparatuses 5 to 7 are notified that the printer 3 is connected to the network 4. Regarding the printers 5 and 6 too, a similar operation is performed.

FIG. 10 illustrates an example of a Bye message of WS-Discovery.

While the printer 3 is connected to the network 4 in a state where the power source of the printer 3 is turned ON, when the power source is turned OFF, this Bye message is sent from the printer 3 to the PCs 1 and 2 and the other peripheral apparatuses 5 to 7 which are connected to the network 4. With this configuration, the PCs 1 and 2 and the other peripheral apparatuses 5 to 7 are notified that the printer 3 is disconnected from the network 4. Regarding the printers 5 and 6 too, a similar operation is performed.

FIG. 11 illustrates an example of "WSD-based N-PnP information" issued from the printer 3.

In FIG. 11, an N-PnP name space 78 regulates the respective definitions of N-PnP. The SOAP metadata element 107 includes the detailed information of the peripheral apparatus (the printer 3). In a WSD friendly name element 48, a friendly name for WSD of the peripheral apparatus (the printer 3) is set. An N-PnP device category element 72 represents a category of the peripheral apparatus (the printer 3). Information (character string) that can be set in the device category element 72 includes Computers, Cameras, Printers, Scanners, Storage, FAX, MFP, Displays, Gaming, Phones, and the like. FIG. 11 shows a state where Printers are set in the device category element 72. In N-PnP unique ID element 73, information with which it is possible to uniquely identify the peripheral apparatus (the printer 3) is set. In FIG. 11, an MAC address is set in the N-PnP unique ID element 73.

With respect to a use availability element 117 on the OS (Windows®) of N-PnP, on the OS equivalent to the in-use OS (Windows Vista®), the following setting can be made as to whether or not it is possible to utilize the peripheral apparatus (the printer 3).

Available . . . Use is permitted.
Unavailable . . . Use is not permitted.

In FIG. 11, the use availability element 117 has Available set therein, and on the OS equivalent to the in-use OS (Windows Vista®), the peripheral apparatus (the printer 3) can be utilized. In an N-PnP compatible ID element 74, for example, an ID representing a WSD service compatibility is set. In FIG. 11, the print service is set in a compatible ID element 74 set therein. In a case where the print service is set in the compatible ID element 74, the install menu 125 and the uninstall menu 129 are displayed, and the install or uninstall of the printer driver 50 can be performed. The information shown in FIG. 11 is issued from the printer 3 to the PCs 1 and 2 and the other peripheral apparatuses 5 to 7 which are connected to the network 4.

FIG. 12 illustrates an example of a HTTP request issued from the PC 1. FIG. 12 illustrates an SSSP request for searching for a UPnP root device issued in step S1803 of FIG. 18 which will be described below. Herein, a number at the left end in FIG. 12 represents a line number. This content is described in the specification of Universal Plug and Play Device Architecture V 1.0 standardized by UPnP Forum. Therefore, according to the present embodiment, only a part related to the present invention is described, and a description of other parts will be omitted.

In FIG. 12, in Search Target at line 3, upnp:rootdevice representing the UPnP root device is specified. As MAN at line 4, "ssdp:discover" is specified. According to the present embodiment, SSDP regulated by Universal Plug and Play Architecture V 1.0 (Simple Service Discovery Protocol) is used. The PC 1 issues a HTTP packet in a format shown in FIG. 12 to the multicast address "239.255.255.250" at the port number "1900". It is noted that the predetermined search request is not limited to a search request of UPnP.

FIG. 13 illustrates an example of an HTTP response notified to the PC 1. FIG. 13 illustrates a SSDP response issued in step S1810 of FIG. 18 from the printer 3 which will be described below. Herein, a number at the left end in FIG. 13 also represents a line number. This content is described in the specification of Universal Plug and Play Device Architecture V 1.0 standardized by UPnP Forum. Therefore, according to the present embodiment, only a part related to the present invention is described, and a description of other parts will be omitted.

In FIG. 13, at line 4, a URL where XML Device Description of the UPnP device supported by the printer 3 exists is specified. At line 5, Notification Type is set, and herein, it is represented that DeviceType of the peripheral apparatus (the printer 3) is Printer:1 standardized by UPnP Forum. At line 6, Notification Sub Type is set, and herein, ssdp:alive representing that the peripheral apparatus (the printer 3) is in the usable state is specified. At line 8, Unique Service Name is set, and a UUID (Universally Unique Identifier) of the peripheral apparatus (the printer 3) is described. According to the present embodiment, SSDP regulated by Universal Plug and Play Architecture V 1.0 (Simple Service Discovery Protocol) is used. Therefore, the printer 3 issues the HTTP packet in a format of FIG. 13 to the multicast address "239.255.255.250" at the port number "1900". It is noted that the predetermined response is not limited to a response of UPnP.

FIG. 14 illustrates an example of "UPnP-based N-PnP information" issued from the printer 3.

In FIG. 14, the UPnP device element 123 includes the detailed information of the peripheral apparatus (the printer 3). It is noted that this device element 123 may be referred to as metadata in some cases. In a UPnP friendly name element 167, the friendly name for UPnP of the peripheral apparatus (the printer 3) is set. FIGS. 14 and 11 both illustrate the information of the printer 3, and therefore in the friendly name element 167 and the friendly name element 48, the identical friendly name "ABC Kmmn" is set. According to the present embodiment, the one peripheral apparatus supporting the plurality of different protocols such as WSD and UPnP can be displayed as one peripheral apparatus on the screen displayed by the network monitor 80. In this manner, in the peripheral apparatus where the printer 3 supports the plurality of different protocols including WSD and UPnP, the friendly name in the WSD-based N-PnP information and the friendly name in the UPnP-based N-PnP information are set to be identical with each other. This setting is one of the features of the present embodiment. On the other hand, as will be described below, in the related art printer 5, the friendly name in the WSD-based N-PnP information and the friendly name in the UPnP-based N-PnP information are set to be different from each other.

An N-PnP device category element 166 represents a category of the peripheral apparatus (the printer 3). As information (character string) that can be set in the N-PnP device category element 166, Printers.Printer, Cameras.DigitalStillCamera, MediaDevices.MusicPlayer, and the like can be set. FIG. 14 illustrates a state where Printers.Printer is set in the device category element 166. In an N-PnP unique ID element 124, information with which it is possible to uniquely identify the peripheral apparatus (the printer 3) is set. In FIG. 14, the MAC address is set in the unique ID element 124. FIGS. 14 and 11 both illustrate the information of the printer 3, and therefore the identical MAC address is set in the unique ID element 124 and the unique ID element 73.

With respect to the use availability element 116 on the OS (Windows®) of N-PnP, on the OS equivalent to the in-use OS (Windows Vista®), the following setting can be made as to whether or not it is possible to utilize the peripheral apparatus (the printer 3).
Available . . . Use is permitted.
Unavailable . . . Use is not permitted.

In FIG. 14, the use availability element 116 has Available set therein, and on the OS equivalent to the in-use OS (Windows Vista®), the peripheral apparatus (the printer 3) can be utilized. As illustrated in FIG. 14, the UPnP device element 123 does not include information such as the N-PnP compatible ID element 74. This is because the printer driver 50 is not used in the UPnP print service, and the printing can be performed without using the printer driver 50. Therefore, the install menu and the uninstall menu for the UPnP print service are not displayed. The information illustrated in FIG. 14 is issued from the printer 3 to the PCs 1 and 2 and the other peripheral apparatuses 5 to 7 which are connected to the network 4.

FIG. 15 illustrates an example of "the WSD-based N-PnP information" issued from the printer 6.

In FIG. 15, an SOAP metadata element 160 includes the detailed information of the peripheral apparatus (the printer 6). An N-PnP device category element 163 represents a category of the peripheral apparatus (the printer 6). In FIG. 15, Printers is set in the device category element 163. In an N-PnP unique ID element 161, information with which it is possible to uniquely identify the peripheral apparatus (the printer 6) is set. In FIG. 15, the MAC address is set in the N-PnP unique ID element 161.

With respect to the use availability element 162 on the OS (Windows®) of N-PnP, on the OS equivalent to the in-use OS (Windows Vista®), the following setting can be made as to whether or not it is possible to utilize the peripheral apparatus (the printer 3).
Available . . . Use is permitted.
Unavailable . . . Use is not permitted.

In FIG. 15, the use availability element 162 has Available set therein, and on the OS equivalent to the in-use OS (Windows Vista®), the peripheral apparatus (the printer 6) can be utilized. In an N-PnP compatible ID element 164, for example, the ID representing the WSD service compatibility is set. In FIG. 15, the compatible ID element 164 has the print service set therein. In a case where the compatible ID element 164 has the print service set therein, the install menu 153 and the uninstall menu 159 are displayed, and the install or uninstall of the printer driver 50 can be performed. The information shown in FIG. 15 is issued from the printer 6 to the PCs 1 and 2 and the other peripheral apparatuses 3, 5, and 7 which are connected to the network 4.

FIG. 16 illustrates an example of "the UPnP-based N-PnP information" issued from the printer 7.

In FIG. 16, a UPnP device element 168 includes the detailed information of the peripheral apparatus (the printer 7). It is noted that this device element 168 may be referred to as metadata in some cases. An N-PnP device category element 169 represents a category of the peripheral apparatus (the printer 7). In FIG. 16, Printers.Printer is set in the device category element 169. In an N-PnP unique ID element 170, information with which it is possible to uniquely identify the peripheral apparatus (the printer 7) is set. In FIG. 16, the MAC address is in the unique ID element 170.

With respect to a use availability element 171 on the OS (Windows®) of N-PnP, on the OS equivalent to the in-use OS (Windows Vista®), the following setting can be made as to whether or not it is possible to utilize the peripheral apparatus (the printer 7).
Available . . . Use is permitted.
Unavailable . . . Use is not permitted.

In FIG. 16, the use availability element 171 has Available set therein, and on the OS equivalent to the in-use OS (Windows Vista®), the peripheral apparatus (the printer 7) can be utilized. As illustrated in FIG. 16, the UPnP device element 168 does not include information such as the N-PnP compatible ID element 164. This is because the printer driver 50 is not used in the UPnP print service, and the printing can be performed without using the printer driver 50. Therefore, the install menu and the uninstall menu for the UPnP print service are not displayed. The information shown in FIG. 16 is issued from the printer 7 to the PCs 1 and 2 and the other peripheral apparatuses 3, 5, and 7 which are connected to the network 4.

FIG. 17 illustrates an example of "the WSD-based N-PnP information" issued from the printer 5.

In FIG. 17, the SOAP metadata element 119 includes the detailed information of the peripheral apparatus (the printer 5). In a WSD friendly name element 120, a friendly name for WSD of the peripheral apparatus (the printer 5) is set. The information shown in FIG. 17 is issued from the printer 5 to the PCs 1 and 2 and the other peripheral apparatuses 3, 6, and 7 which are connected to the network 4.

FIG. 18 illustrates an example of "the UPnP-based N-PnP information" issued from the printer 5.

In FIG. 18, the UPnP device element 124 includes the detailed information of the peripheral apparatus (the printer 5). It is noted that this device element 121 may be referred to as metadata in some cases. In a UPnP friendly name element 122, the friendly name for UPnP of the peripheral apparatus (the printer 5) is set. The information shown in FIG. 15 is issued from the printer 5 to the PCs 1 and 2 and the other peripheral apparatuses 3, 6, and 7 which are connected to the network 4. FIGS. 18 and 17 both illustrate the information of the printer 5, but in the friendly name element 120 and the friendly name element 122, friendly names different for each protocol such as "ABC Xyz WSD" and "ABC Xyz UPnP" are set. This is because the printer 5 is a related art printer which is not provided with the newly proposed novel functions according to the present embodiment. For example, such a case is considered that the identical friendly name like "ABC Xyz" is set in the friendly name element 120 and the friendly name element 122. In that case, in the screen displayed by the network monitor 80, the name of the icon 44 representing the printer 5 as the printer corresponding to WSD and the name of the icon 45 representing the printer 5 as the printer corresponding to UPnP are both "ABC Xyz". Therefore, at the time of display sorting, such a problem is generated that the network monitor 80 may malfunction, or a user may be confused.

In view of the above, according to the present embodiment, among the printers 3 and 5 corresponding to UPnP and WSD, regarding the printer 3 having a function of sending a unique ID, the friendly names are set identical for WSD-based N-PnP and UPnP-based N-PnP. On the other hand, regarding the printer 5 which does not have the function of sending the unique ID, the friendly names are set different for WSD-based N-PnP and UPnP-based N-PnP. With this configuration, the network folder and the network monitor 80 do not malfunction, and it is possible to correctly display the information of the printers 3 and 5.

As described above, according to the present embodiment, for example, the unique ID elements 73, 124, 161, and 170 realize an example of the identification information. Also, according to the present embodiment, for example, the friendly name elements 48 and 167 realize an example of the name information, and for example, the use availability elements 116, 117, 162, and 171 realize an example of the use availability information.

Figure 19:
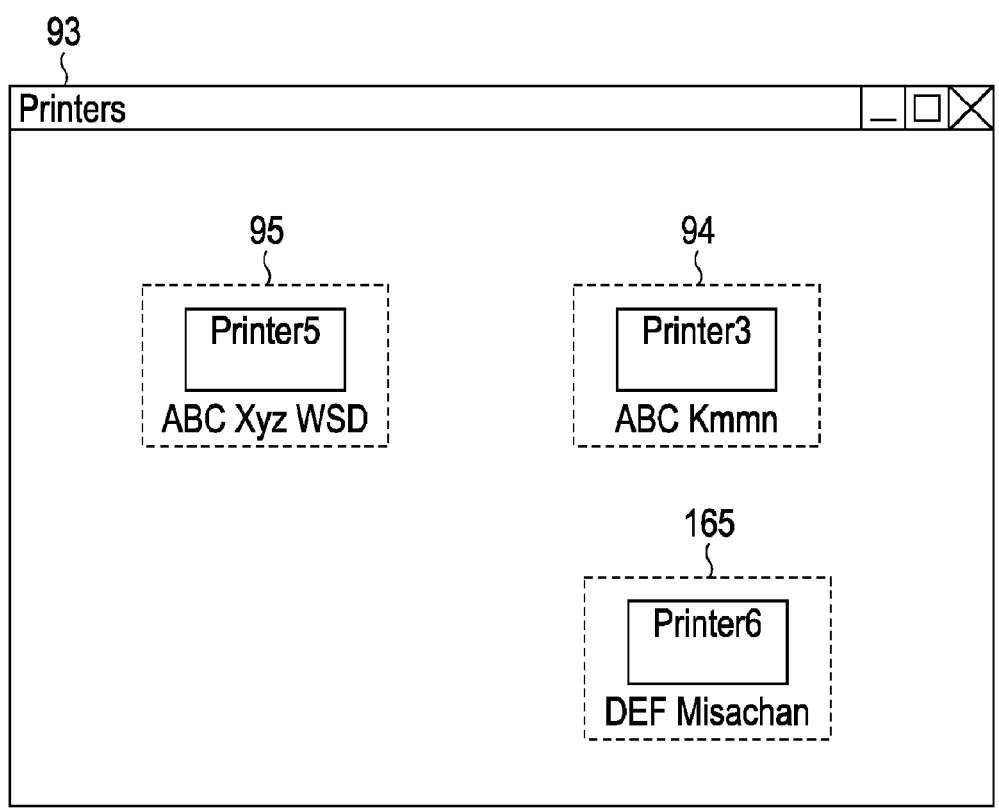
FIG. 19 illustrates an example of a print folder according to the first exemplary embodiment of the present invention.

FIG. 19 illustrates an example of a printer folder.

In FIG. 19, the printer folder 93 is displayed on the LCD 1205 of the PC 1, and the printer in a state that can be used in the PC 1 is displayed in the printer folder 93. In FIG. 19, it is represented that the printer 3 and the printer 5 are in a state that can be used as the printers corresponding to WSD. The printer icon 94 represents a state in which the printing can be performed as the printer 3 uses the WSD print service. The printer icon 95 represents a state in which the printing can be performed as the printer 5 uses the WSD print service. The printer icon 165 represents a state in which the printing can be performed as the printer 6 uses the WSD print service.

Figure 20:
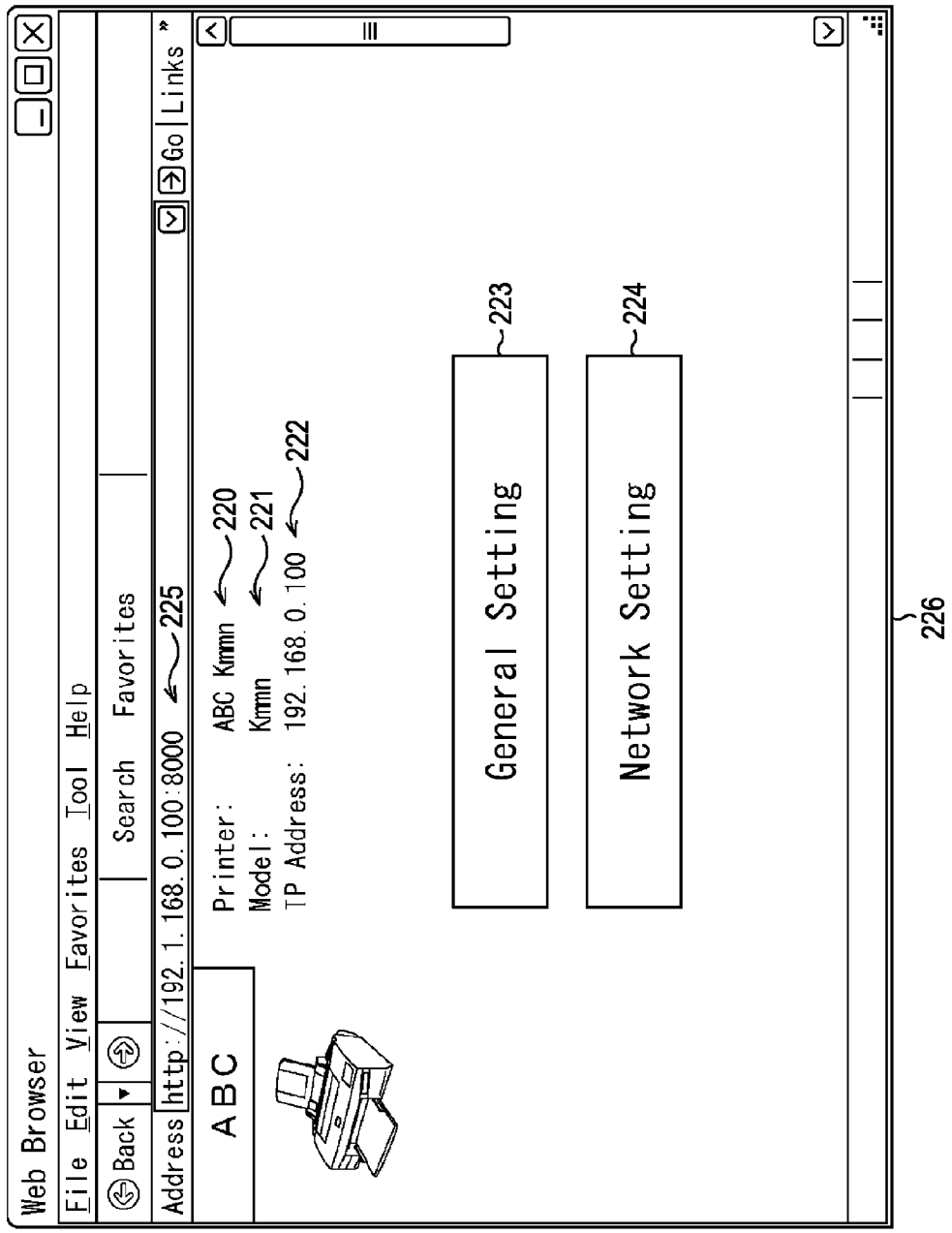
FIG. 20 illustrates an example of a setting screen of the printer according to the first exemplary embodiment of the present invention.

FIG. 20 illustrates an example of a setting screen for the printer.

In FIG. 20, a setting page 226 represents a main page of the setting screen for the printer. An address display part 225 displays a URL of this setting screen. In a printer name display unit 220, as (Printer:), the friendly name of the printer 3 set in the friendly name element 48 shown in FIG. 11 is displayed. In a model name display unit 221 (Model:), the model name of the printer 3 set in the <wsdp:ModelName> element shown in FIG. 11 is set. An IP address display unit 222 (IP Address:) displays the IP address of the printer 3. When a general setting button 223 is clicked, a general setting dialog for performing a general setting is displayed. It is noted that a description of the general setting dialog will be omitted herein. When a network setting button 224 is clicked, a network setting dialog for performing a network setting is displayed. It is noted that a description of the network setting dialog will be omitted herein.

Figure 21:
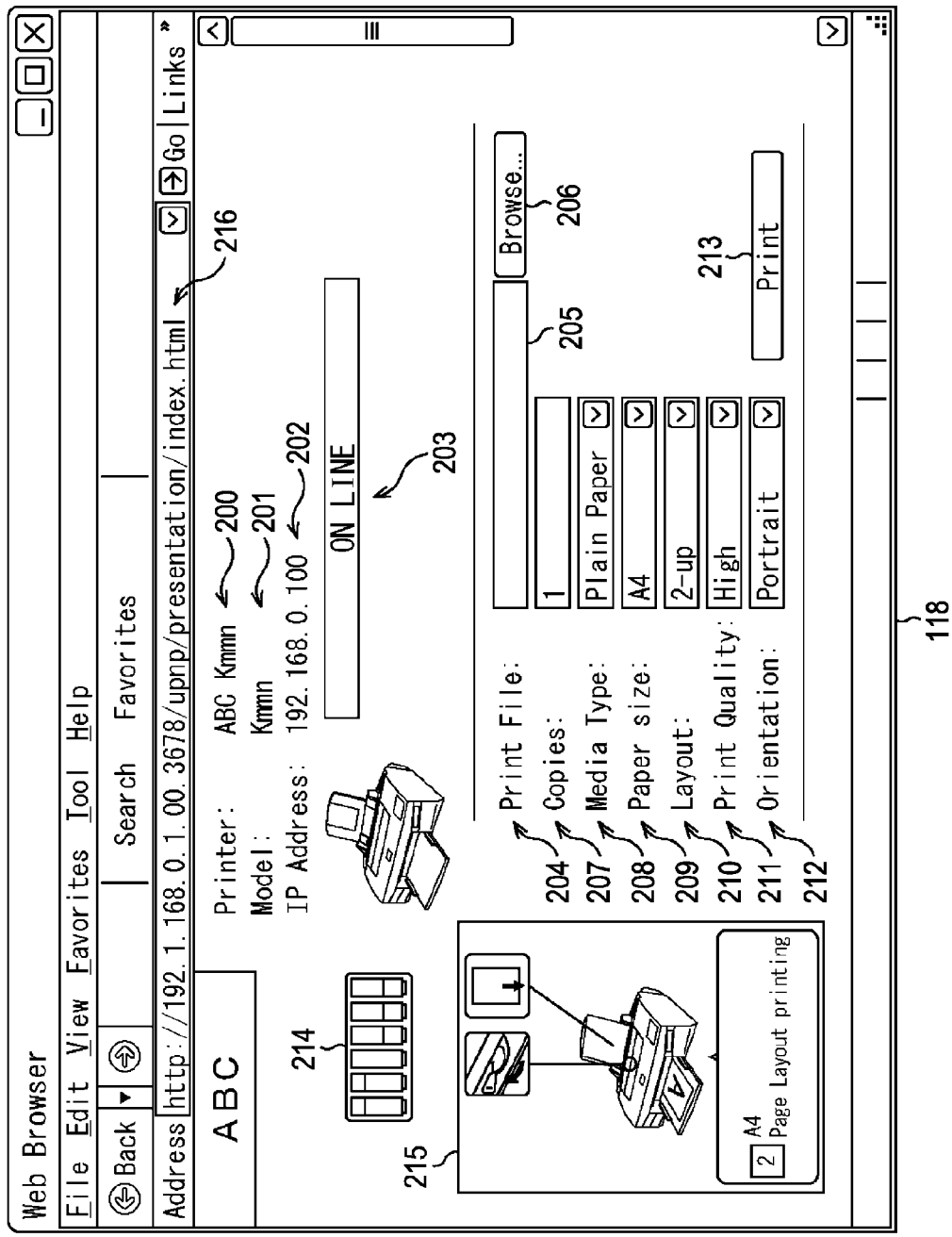
FIG. 21 illustrates an example of a print setting screen for UPnP Print according to the first exemplary embodiment of the present invention.

FIG. 21 illustrates an example of a print setting screen for the UPnP Print.

In FIG. 21, a print setting page for the UPnP Print 118 represents a main page of the print setting screen for the UPnP Print. In an address display unit 216, a URL for this print setting screen is displayed. In a printer name display unit (Printer:) 200, the friendly name of the printer 3 set in the friendly name element 167 shown in FIG. 14 is displayed. In a model name display unit (Model:) 201, the display name of the printer 3 set in the <modelName> element of FIG. 14 is displayed. An IP address display unit 202 (IP Address:) displays the IP address of the printer 3. A printer state display unit 203 displays a state of the printer 3. In FIG. 21, it is represented that the printer 3 is in an "ON LINE" state.

A file selection unit 204 (Print File:) is composed of a file name display unit 205 and a reference button 206. As the user clicks the reference button 206, when the file of the printing target is selected, the file name is displayed on the file name display unit 205. In a copy number specification unit (Copies:) 207, the number of printing sheets can be specified in a range, for example, of 1 to 100 sheets. In a sheet type selection unit (Media Type:) 208, a type of sheet (media) can be selected, for example, from Plain Paper, Photo Paper, and OHP Sheet. In a sheet size selection unit 209 (Paper Size:), the sheet size can be selected, for example, from A4, A5, B5, and Letter. In a printing layout selection unit 210 (Layout:), the print layout can be selected, for example, from 1-up, 2-up, and 4-up.

In a print quality specification unit 211 (Print Quality:), the print quality be selected from High, Standard, and Draft. In a print orientation selection unit 212 (Orientation:), the print orientation can be selected from Portrait and Landscape. When a print button 213 (Print) is clicked by the user, the printing starts. In an ink remaining amount display unit 214, an ink remaining amount of an ink cartridge mounted to the printer 3 is displayed. An operation guide unit 215 displays an operation guide as a support for the user operation. By utilizing this print setting page, without installing the printer driver 50 for the printer 3 into the PC 1, it is possible to perform printing in a driver-less manner without using the printer driver 50 (hereinafter, such a printing may be abbreviated as driver-less printing). In this way, when the UPnP print service is used, the driver-less printing can be performed.

In contrast to this, in the case of the printing using the WSD print service, the printing via the printer driver 50 is performed. In a case where a file opened with Notepad (Notepad.exe) supplied with the OS as a default is performed, the following operation procedure is adopted.

From [File] menu, [Print . . . ] menu is selected, and the Print dialog is opened.

After the printer used for the printing is selected, when [Print] button is clicked, the printing is executed. It is noted that the printer displayed in the Print dialog is the printer displayed in the printer folder 93.

Figure 22:
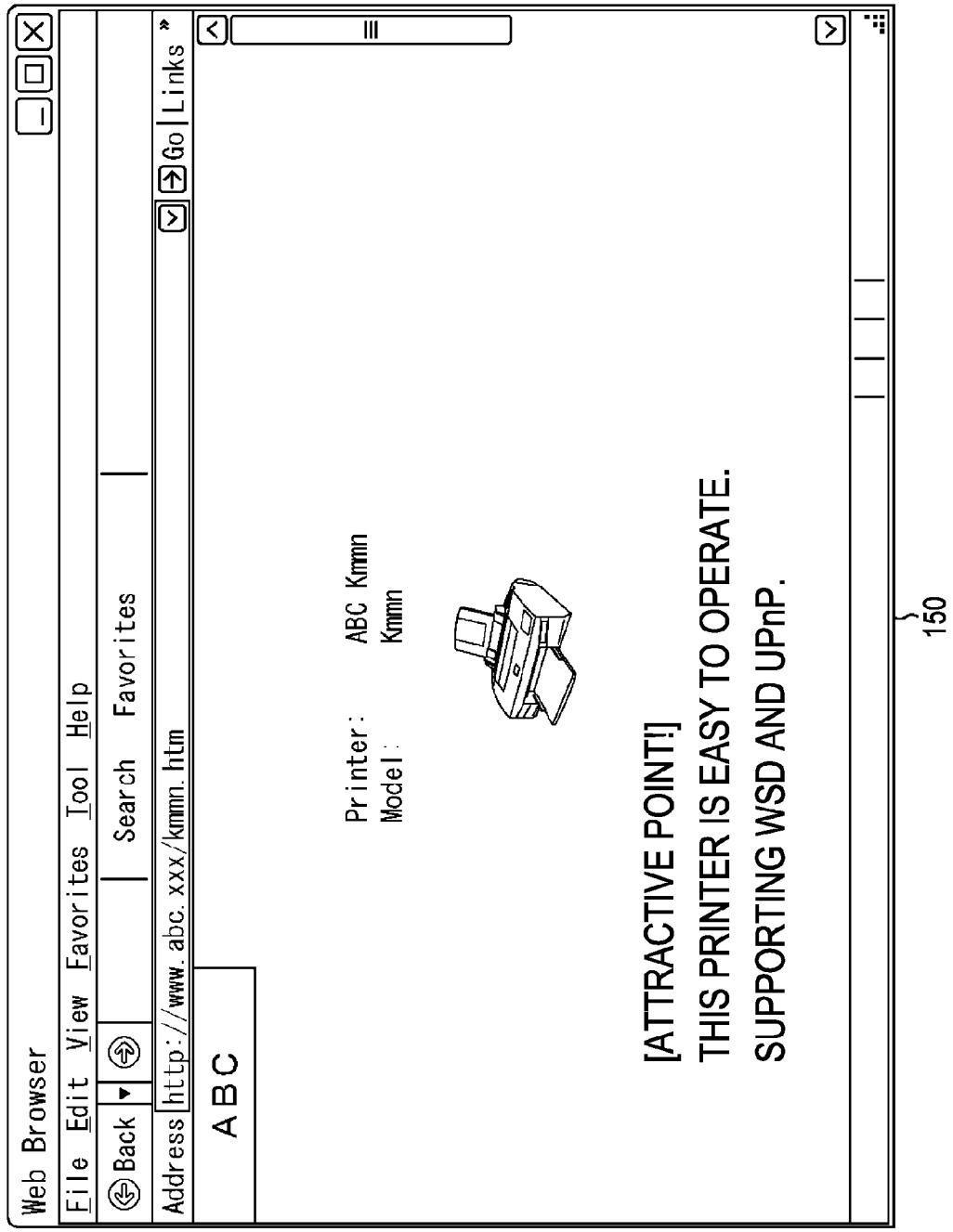
FIG. 22 illustrates an example of a web page related to the printer according to the first exemplary embodiment of the present invention.

FIG. 22 illustrates an example of a web page related to the printer 3.

In FIG. 22, a main page 150 is a main page of the printer 3 with the model name of Kmmn made by ABC Company, where the detailed information and the like related to the printer 3 are described.

Figure 23:
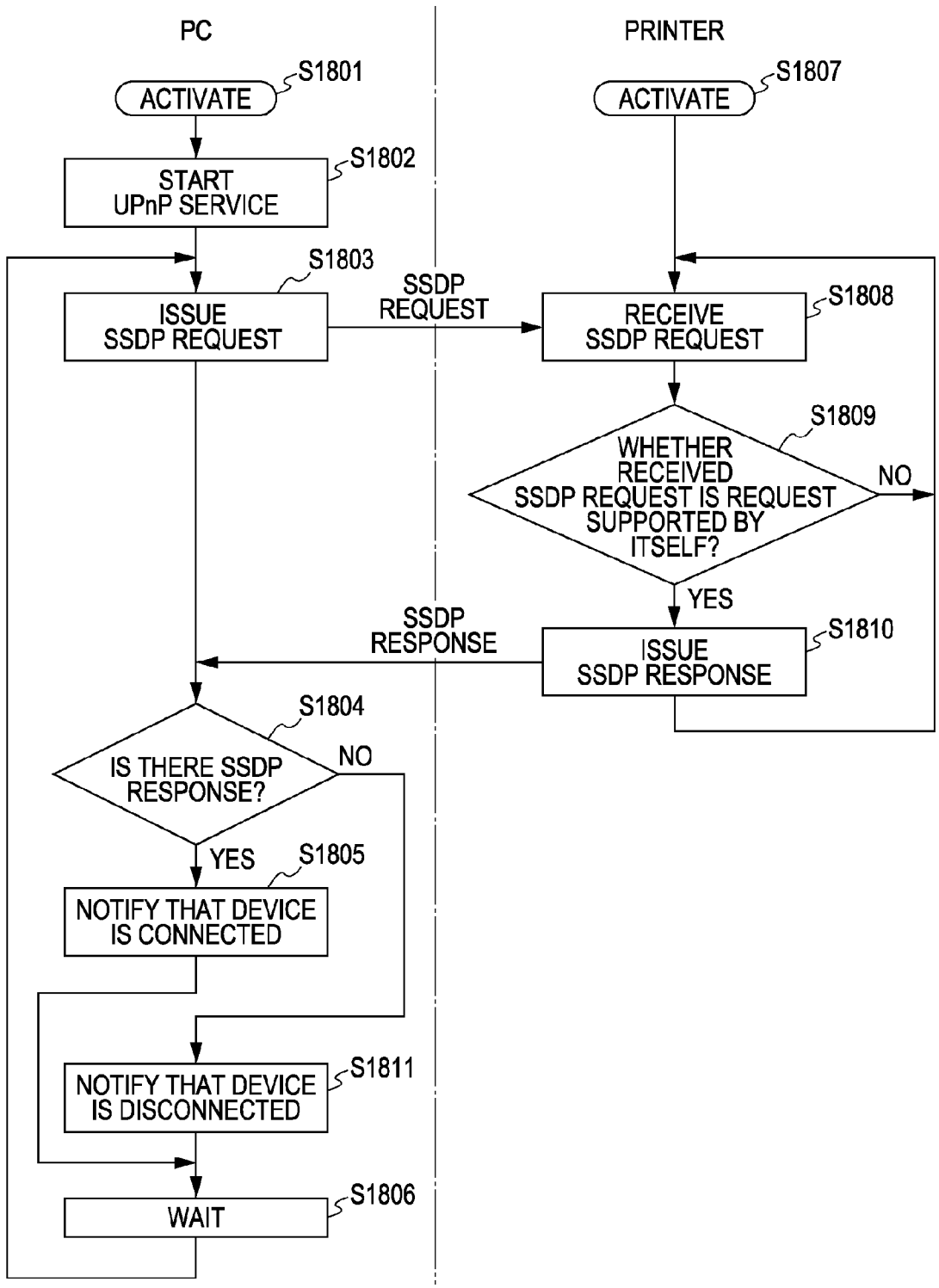
FIG. 23 is a flowchart for describing a processing example in the peripheral apparatus control system at the time of detecting the device corresponding to the UPnP according to the first exemplary embodiment of the present invention.

FIG. 23 is a flowchart for describing an example of processing in the peripheral apparatus control system at the time of detecting the device corresponding to UPnP. It is noted that the operations of the PCs 1 and 2 are identical with each other, and therefore, in the following description, the operation of the PC 1 will be described as an example, and a description of the operation of the PC 2 will be omitted.

In FIG. 23, first, the PC 1 is activated (step S1801). Next, a UPnP control stack 89 starts the UPnP service (step S1802), and the first network control stack 92 issues the SSSP request for searching for the UPnP root device (step S1803).

Next, the UPnP control stack 89 determines whether or not there is an SSDP response to the SSDP request from the printer (for example, any one of the printers 3, and 5 to 7) (step S1804). As a result of this determination, in a case where the SSDP response from the printer exists, the UPnP control stack 89 notifies the network monitor 80 that the printer is connected to the network 4 while the printer identified by the relevant SSDP response is in the state where the power source is turned ON (step S1805). Then, the UPnP control stack 89 stands by for a certain period of time (for example, one minute) (step S1806), and then the flow returns to step S1803.

In a case where the printer is connected to the network 4 while the power source is turned ON, where the power source of the printer is turned OFF, or where the printer is disconnected from the network 4, in step S1804, it is determined that the SSDP response from the printer does not exist. After that, the UPnP control stack 89 notifies the network monitor 80 that the printer is disconnected from the network 4 (step S1811), and the flow advances to step S1806.

On the other hand, while the printer is in the activated state (step S1807), when the printer receives the SSDP request issued from the PC 1 in step S1803 (step S1808), the printer performs the following processing. That is, the printer determines whether or not the SSDP request received in step S1808 is matched with the request which is supported by itself (the SSSP request for searching for the UPnP root device) (step S1809). As a result of this determination, in a case where the SSDP request received in step S1808 is matched with the request which is supported by itself, the printer issues the SSDP response to the PC 1 which has issued the SSDP request (step S1810). After that, the flow is returned to a waiting state to receive the SSDP request in step S1808.

On the other hand, in step S1809, in a case where the SSDP request received in step S1808 is not matched with the request which is supported by itself, the flow returns to step S1808.

In this manner, in a case where the UPnP-compatible device exists on the network 4 while the power source is turned ON, the network monitor 80 is notified that the relevant UPnP-compatible device is connected. With this configuration, the network monitor 80 can control the UPnP-compatible device.

Figure 24:
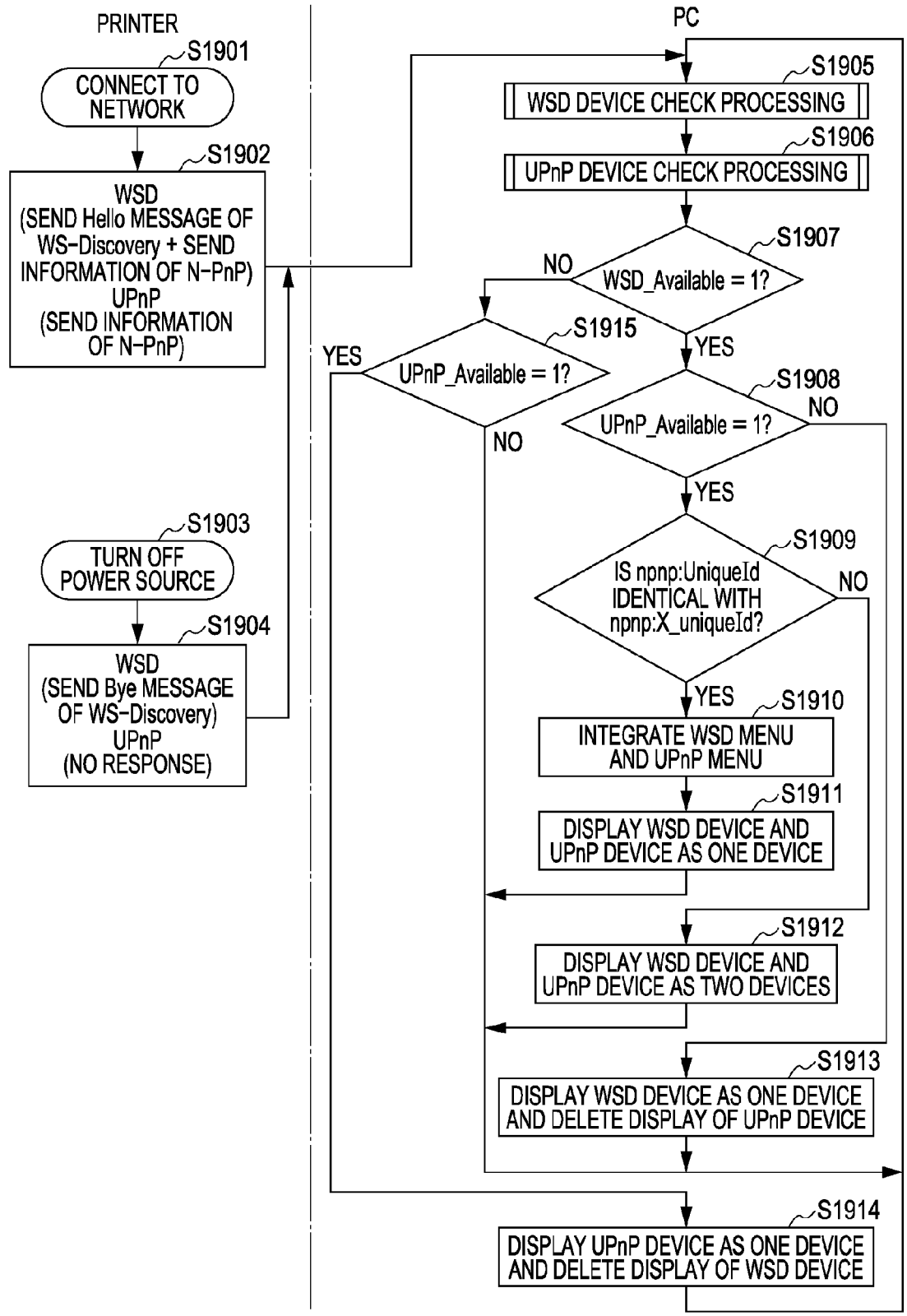
FIG. 24 is a flowchart for describing a processing example in the peripheral apparatus control system at the time of displaying information of the printer functioning as the peripheral apparatus according to the first exemplary embodiment of the present invention.

FIG. 24 is a flowchart for describing an example of a processing the peripheral apparatus control system at the time of displaying the information of the printer which is the peripheral apparatus. The control on the PC 1 side in FIG. 24 is performed by the network monitor 80 and the OS. At that time, the control is performed via the respective pieces of software shown in FIG. 4. The processing executed by the network monitor 80 is performed via the API/DDI interface 84. It is noted that as variables WSD_Available and UPnP_Available used in the description of FIG. 24, 0 is set after being initialized at the time of the activation of the OS.

In FIG. 24, when the printer corresponding to WSD is connected to the network 4 while the power source is turned ON (step S1901), the relevant printer issues such a Hello message of WS-Discovery as shown in FIG. 9 (step S1902). After that, the printer corresponding to WSD sends such WSD-based N-PnP information as shown in FIG. 11, 15, or 17 to the PC 1 (step S1902).

On the other hand, when the printer corresponding to UPnP is connected to the network 4 while the power source is turned ON (step S1901), the following processing is performed. That is, as described in step S1805 of FIG. 23, the network monitor 80 is notified that the printer corresponding to UPnP is connected to the network 4 while the power source is turned ON (step S1902). After that, the printer corresponding to UPnP sends the UPnP-based N-PnP information shown in FIG. 14, 16, or 18 to the PC 1 (step S1902).

As described above, according to the present embodiment, for example, by performing the processing in step S1902, the examples of the sending unit, the second sending unit, and the third sending unit are realized.

On the other hand, after the PC 1 executes the checking processing for the printer corresponding to WSD (step S1905), the PC 1 executes the checking processing for the device corresponding to UPnP (step S1906). Next, the PC 1 determines whether or not the variable WSD_Available is 1 (step S1907). In this way, according to the present embodiment, for example, by performing the processing in steps S1905 and 1906, the one examples of the obtaining unit, the second obtaining unit, the third obtaining unit are realized.

As a result of this determination, in a case where the variable WSD_Available is 1, the PC 1 determines whether or not the variable UPnP_Available is 1 (step S1908).

As a result of this determination, in a case where the variable UPnP_Available is 1, the PC 1 determines whether or not npnp:UniqueId is the same as npnp:X_uniqueId (step S1909). That is, it is determined whether or not the MAC address set in the unique ID element 73 shown in FIG. 11 is the same as the MAC address set in the unique ID element 124 shown in FIG. 14 (step S1909). In this way, according to the present embodiment, for example, by performing the processing in step S1909, the one example of the determination unit is realized.

As a result of this determination, in a case where npnp:UniqueId is the same as npnp:X_uniqueId, the PC 1 integrates the menu for WSD with the menu for UPnP (step S1910). Then, through the network monitor 80, the PC 1 displays the printer corresponding to WSD and the printer corresponding to UPnP as one device (step S1911), and the flow returns to step S1905. In this way, according to the present embodiment, for example, by performing the processing in step S1911, the one example of the display unit is realized.

As shown in FIGS. 7 and 8, the menus for WSD include the install menus 125, 51, and 153, the uninstall menus 129, 79, and 159, the WSD property display menus 127, 53, and 155, and the webpage link menus 126, 52, and 154. On the other hand, as illustrated in FIGS. 7 and 8, the menus for UPnP include the UPnP print menus 128, 47, and 157 and the webpage link menus 126, 46, and 156. In FIGS. 7 and 8, the web page link menu of the menu for WSD and the web page link menu of the menu for UPnP are common, and therefore these menus are collectively displayed in a state of being integrated as the one webpage link menu 126.

In step S1909, in a case where it is determined that npnp:UniqueId and npnp:X_uniqueId are different from each other, the PC 1 performs the following processing. That is, through the network monitor 80, the PC 1 individually displays the printer corresponding to WSD and the printer corresponding to UPnP as independent two devices (step S1912), and the flow returns to step S1905. In this way, according to the present embodiment, for example, by performing the processing in step S1912, the one example of the display unit is realized.

In step S1908, in a case where it is determined that the variable UPnP_Available is not 1 but 0, through the network monitor 80, the PC 1 displays the printer corresponding to WSD as one device. Then, through the network monitor 80, the PC 1 deletes the display of "the printer corresponding to UPnP" which was displayed but now disconnected from the network 4 (step S1913), and the flow returns to step S1905.

In step S1907, when it is determined that the variable WSD_Available is not 1 but 0, the PC 1 determines whether or not the variable UPnP_Available is 1 (step S1915). As a result of this determination, in a case where the variable UPnP_Available is 1, through the network monitor 80, the PC 1 displays the printer corresponding to UPnP as one device. Then, the PC 1 deletes the display of "the device corresponding to WSD" which was displayed but now disconnected from the network 4 (step S1914), and the flow returns to step S1905.

On the other hand, in step S1915, in a case where it is determined that the variable UPnP_Available is not 1 but 0, the flow returns to step S1905.

When the printer corresponding to WSD is connected to the network 4 while the power source is turned ON, in a case where the power source is turned OFF (step S1903), the printer issues the Bye message of WS-Discovery shown in FIG. 10 (step S1904). On the other hand, when the printer corresponding to UPnP is connected to the network 4 while the power source is turned ON, in a case where the power source is turned OFF or when the printer corresponding to UPnP is disconnected from the network 4 (step S1903), the following processing is performed. That is, as described in step S1811 of FIG. 23, the network monitor 80 is notified that the relevant printer corresponding to UPnP is disconnected from the network 4 (step S1904). Then, the processing in step S1905 is executed.

Herein, if the peripheral apparatus is the printer 3, in step S1911 of the flowchart shown in FIG. 24, through the network monitor 80, the printer corresponding to WSD and the device corresponding to UPnP are displayed as one device. By mounting such a technology newly disclosed herein to the peripheral apparatus (the printer 3), for example, the peripheral apparatus provided with the plurality of different protocols such as WSD and UPnP can be displayed as one device in the form of the icon 43 through the network monitor 80. With this configuration, it is possible to realize the peripheral apparatus control system provided with the appropriate user interface which does not cause the misunderstanding or confusion of the user.

In addition, if the peripheral apparatus is the printer 6, in step S1913 of the flowchart shown in FIG. 24, through the network monitor 80, the printer corresponding to WSD is displayed as one device. Also, if the peripheral apparatus is the printer 7, in step S1914 of the flowchart shown in FIG. 24, through the network monitor 80, the printer corresponding to UPnP is displayed as one device. Furthermore, if the peripheral apparatus is the printer 5, in step S1912 of the flowchart shown in FIG. 24, through the network monitor 80, the printer corresponding to WSD and the device corresponding to UPnP are separately displayed as one independent two devices.

Figure 25:
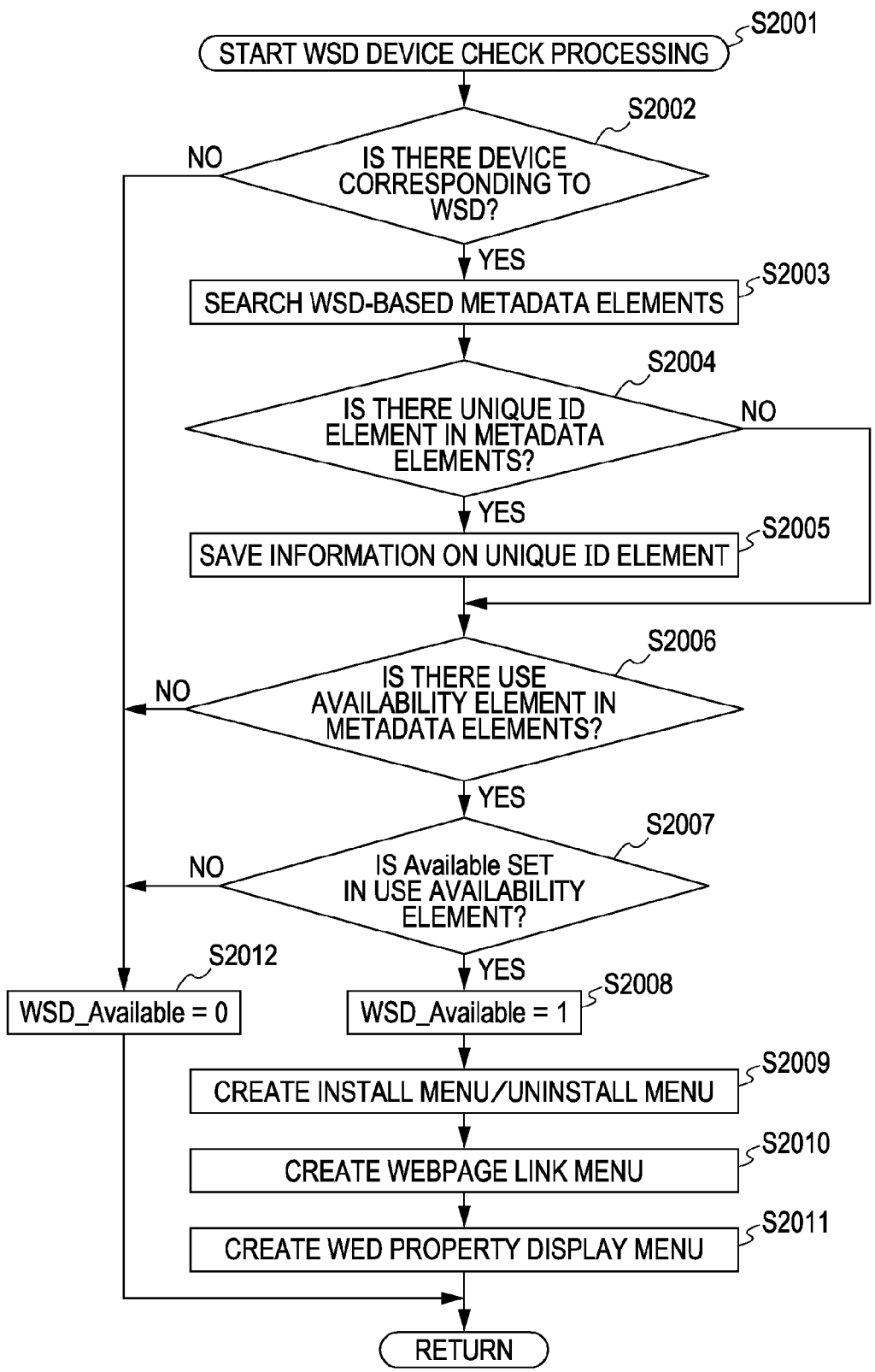
FIG. 25 is a flowchart for describing an example of a detail of a check processing for the device corresponding to WSD in step S1905 of FIG. 24 according to the first exemplary embodiment of the present invention.

FIG. 25 is a flowchart for describing an example of a detail of a checking processing for the device corresponding to WSD in step S1905 of FIG. 24.

In FIG. 25, when the checking processing for the device corresponding to WSD is started (step S2001), on the PC 1 determines whether or not the device corresponding to WSD exists on the network 4 (step S2002). As a result of this determination, in a case where the device corresponding to WSD does not exist on the network 4, the flow advances to step S2012 which will be described below. On the other hand, in a case where the device corresponding to WSD exists on the network 4, the PC 1 searches "the WSD-based metadata element 107" shown in FIG. 11 (step S2003). To be more specific, the PC 1 checks the unique ID element 73 shown in FIG. 11, and the unique ID element (npnp:UniqueId) and the use availability element (npnp:UseDeviceOnWindows) shown in the use availability element 117.

Then, the PC 1 determines whether or not the unique ID element 73 exists in the WSD-based metadata element 107 (step S2004). As a result of this determination, in a case where the unique ID element 73 exists in the WSD-based metadata element 107, the PC 1 saves the information set in the unique ID element 73 in the storage medium (step S2005). Then, the flow advances to step S2006.

On the other hand, in a case where the unique ID element 73 does not exist in the WSD-based metadata element 107, the processing in step S2005 is omitted, and the flow advances to step S2006.

Then, the PC 1 determines whether or not the use availability element 117 exists in the WSD-based metadata element 107 (step S2006). As a result of this determination, in a case where the use availability element 117 does not exist in the WSD-based metadata element 107, the flow advances to step S2012 which will be described below.

On the other hand, in a case where the use availability element 117 exists in the WSD-based metadata element 107, the PC 1 determines whether or not the use availability element 117 has Available set therein (step S2007). As a result of this determination, in a case where the use availability element 117 does not have Available set therein, the flow advances to step S2012 which will be described below. On the other hand, in a case where the use availability element 117 has Available set therein, the PC 1 sets 1 in the variable WSD_Available (step S2008).

Then, the PC 1 creates such an install menu as the install menu 125 of FIG. 7 or such an uninstall menu as the uninstall menu 129 of FIG. 7 (step S2009). Next, the PC 1 creates such a web page link menu as the webpage link menu 126 of FIG. 7 (step S2010), and further creates such a WSD property display menu as the WSD property display menu 127 of FIG. 7 (step S2011). Then, while returning back to the flowchart of FIG. 24, the processing in step S1906 of FIG. 24 is performed.

In a case where the device corresponding to WSD does not exist (step S2002), where the use availability element 117 does not exist (step S2006), and where the use availability element 117 has Unavailable set therein (step S2007), the PC 1 performs the following processing. That is, the PC 1 sets 0 in the variable WSD_Available (step S2012). Then, while returning back to the flowchart of FIG. 24, the processing in step S1906 of FIG. 24 is performed.

Figure 26:
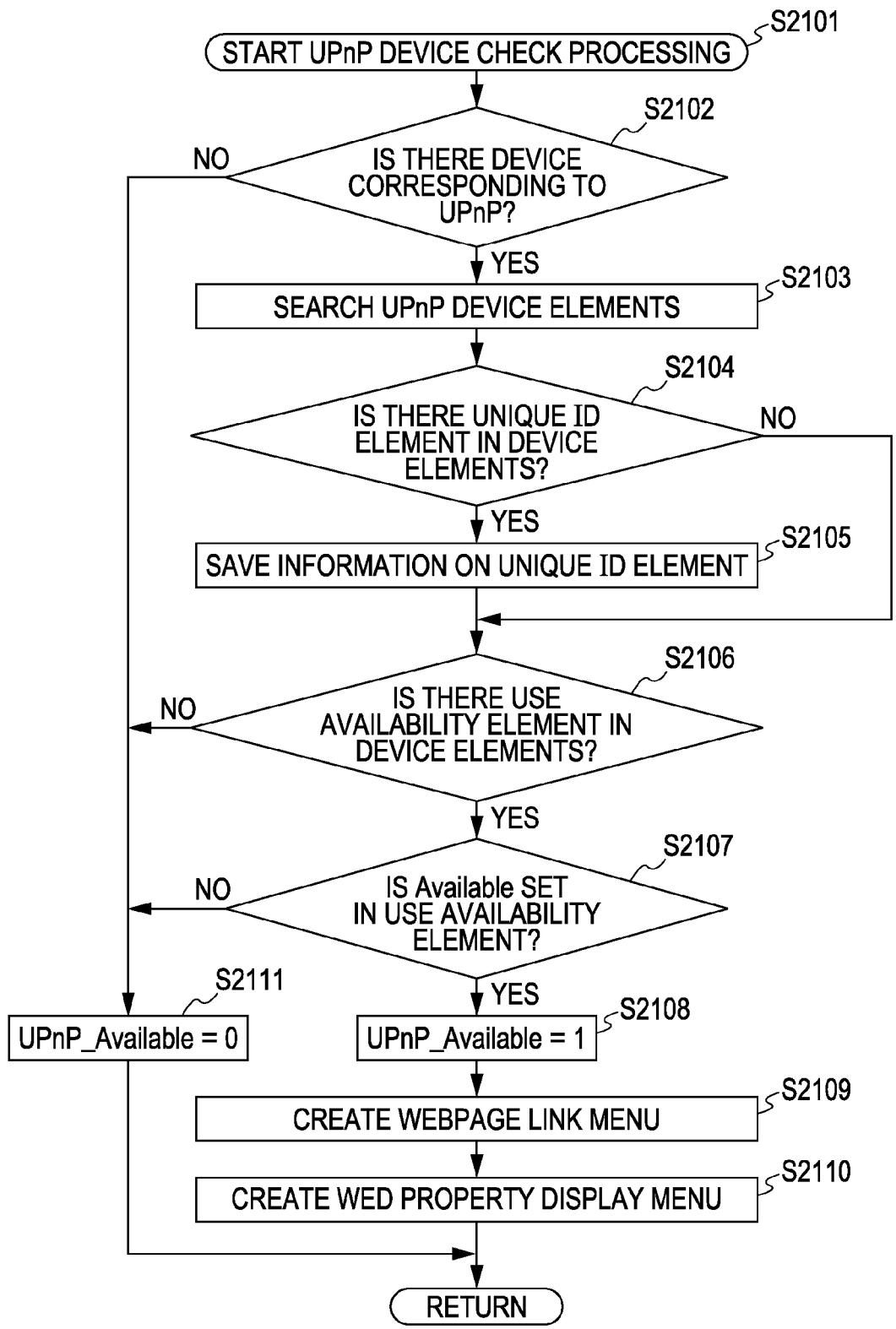
FIG. 26 is a flowchart for describing an example of a detail of the check processing for the device corresponding to the UPnP in step S1906 of FIG. 24 according to the first exemplary embodiment of the present invention.

FIG. 26 is a flowchart for describing an example of a detail of the checking processing for the device corresponding to UPnP in step S1906 of FIG. 24.

In FIG. 26, when the checking processing for the device corresponding to UPnP is started (step S2101), the PC 1 determines whether or not the device corresponding to UPnP exists on the network 4 (step S2102). As a result of this determination, in a case where the device corresponding to UPnP does not exist on the network 4, the flow advances to step S2111. On the other hand, in a case where the device corresponding to UPnP exists on the network 4, the PC 1 searches "the UPnP device element 123" shown in FIG. 14 (step S2103). To be more specific, the PC 1 checks the unique ID element 124 shown in FIG. 14, and the unique ID element (npnp:X_uniqueId) and the use availability element (npnp:X_useDeviceOnWindows) shown in the use availability element 116.

Then, the PC 1 determines whether or not the unique ID element 123 exists in the UPnP device element 123 (step S2104). As a result of this determination, in a case where the unique ID element 123 exists the UPnP device element 123, the PC 1 saves the information set in the unique ID element 123 in the storage medium (step S2105). Then, the flow advances to step S2106.

On the other hand, in a case where the unique ID element 123 does not exist the UPnP device element 123, step S2105 is omitted, and the flow advances to step S2106.

Then, the PC 1 determines whether or not the use availability element 116 exists in the UPnP device element 123 (step S2106). As a result of this determination, in a case where the use availability element 116 does not exist in the UPnP device element 123, the flow advances to step S2111 which will be described below.

On the other hand, in a case where the use availability element 116 exists the UPnP device element 123, the PC 1 determines whether or not the use availability element 116 has Available set therein(step S2107). As a result of this determination, in a case where the use availability element 116 does not have Available set therein, the flow advances to step S2111 which will be described below. On the other hand, in a case where the use availability element 116 has Available set therein, the PC 1 sets 1 in the variable UPnP_Available (step S2108).

Then, the PC 1 creates such a web page link menu as the webpage link menu 126 of FIG. 7 (step S2109), and further creates such a UPnP print menu as the UPnP print menu 128 of FIG. 7 (step S2110). Then, while returning back to the flowchart of FIG. 24, the processing in step S1907 of FIG. 24 is performed.

In addition, in a case where the device corresponding to UPnP does not exist (step S2102), where the use availability element 116 does not exist (step S2106), and where the use availability element 116 has Unavailable set therein (step S2107), the PC 1 performs the following processing. That is, the PC 1 sets 0 in the variable UPnP_Available (step S2111). Then, while returning back to the flowchart of FIG. 24, the processing in step S1907 of FIG. 24 is performed.

For example, in a case where the OS of the PC 1 is set to have such a mode that the device corresponding to UPnP is not used by the user, and only the device corresponding to WSD is used by the user, for example, the following setting is performed on the printer 3. That is, Available is set in the use availability element 117 of "the WSD-based N-PnP information" shown in FIG. 11. Furthermore, Unavailable is set in the use availability element 116 of "the UPnP-based N-PnP information" shown in FIG. 14. With this configuration, even when the unique ID elements 73 and 124 do not exist, through the network monitor 80, it is possible to display the printer 3 as one device with the icon 43. In the printer 5, the following setting is presumed to be performed. That is, the use availability element where Available is set in the metadata element 119 of "the WSD-based N-PnP information" of FIG. 17 is provided. Furthermore, the use availability element where Unavailable is set in the device element 121 of "the UPnP-based N-PnP information" of FIG. 18 is provided. In such a case, the unique ID element does not exist in the metadata element 119 and the device element 121, but through the network monitor 80, it is possible to display the printer 5 as one device with the icon 44. In this case, as the icon 45 is not displayed, it is possible to realize the peripheral apparatus control system provided with an appropriate user interface which can improve the user operability and which does not cause the misunderstanding or confusion of the user with the improved user operability.

Subsequently, a second exemplary embodiment of the present invention will be described. In the description according to the present embodiment, for example, the same parts as those according to the above-described first exemplary embodiment are allocated with the same reference numerals as those allocated to the parts in FIGS. 1 to 26, and a detailed description will be omitted.

Figure 27:
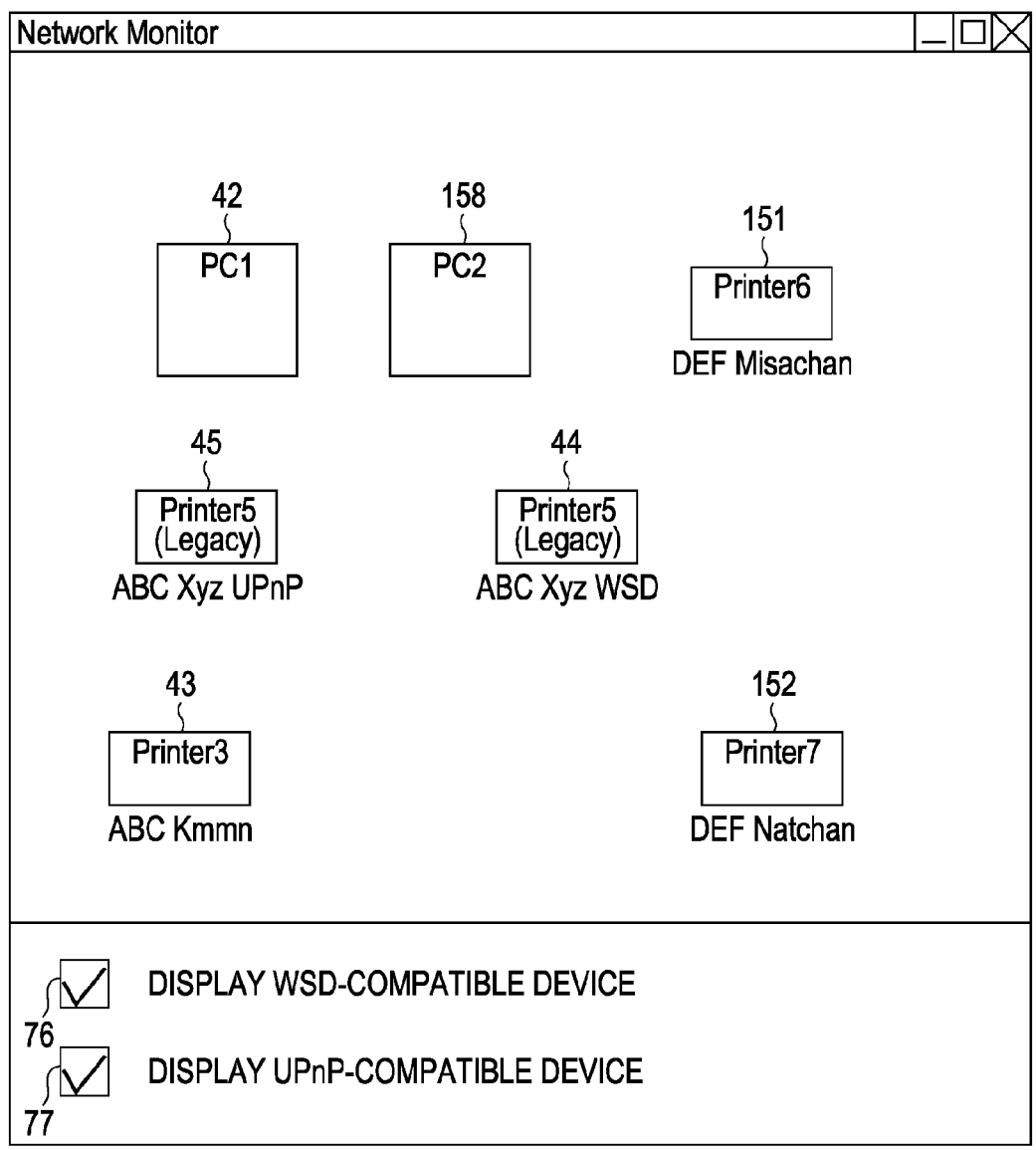
FIG. 27 illustrates a first example of a screen displayed by a network monitor according to a second exemplary embodiment of the present invention.

FIG. 27 illustrates a first example of the screen displayed by the network monitor 80. As compared with the screen shown in FIG. 6, the screen shown in FIG. 27 is added with a function allowing the user to select any one of only displaying of the device corresponding to WSD, displaying of the device corresponding to UPnP, displaying of both the devices, and displaying of no devices.

In FIG. 27, in a case where the WSD-compatible device display check box 76 is ON (in a case where the box is checked), through the network monitor 80, the device corresponding to WSD is displayed on the screen. On the other hand, in a case where the WSD-compatible device display check box 76 is OFF (in a case where the box is not checked), through the network monitor 80, the device corresponding to WSD is not displayed on the screen. In a case where the UPnP-compatible device display check box 77 is ON (in a case where the box is checked), through the network monitor 80, the device corresponding to UPnP is displayed on the screen. On the other hand, the UPnP-compatible device display check box 77 is OFF (in a case where the box is not checked), through the network monitor 80, the device corresponding to UPnP is not displayed on the screen.

In a case where the WSD-compatible device display check box 76 shown in FIG. 27 and the UPnP-compatible device display check box 77 are both ON, the same display contents shown in FIGS. 6 to 8 are obtained. In a case where the WSD-compatible device display check box 76 and the UPnP-compatible device display check box 77 are both in the OFF state, through the network monitor 80, the icons 43, 44, 45, 151, and 152 are not displayed on the screen.

Figure 28:
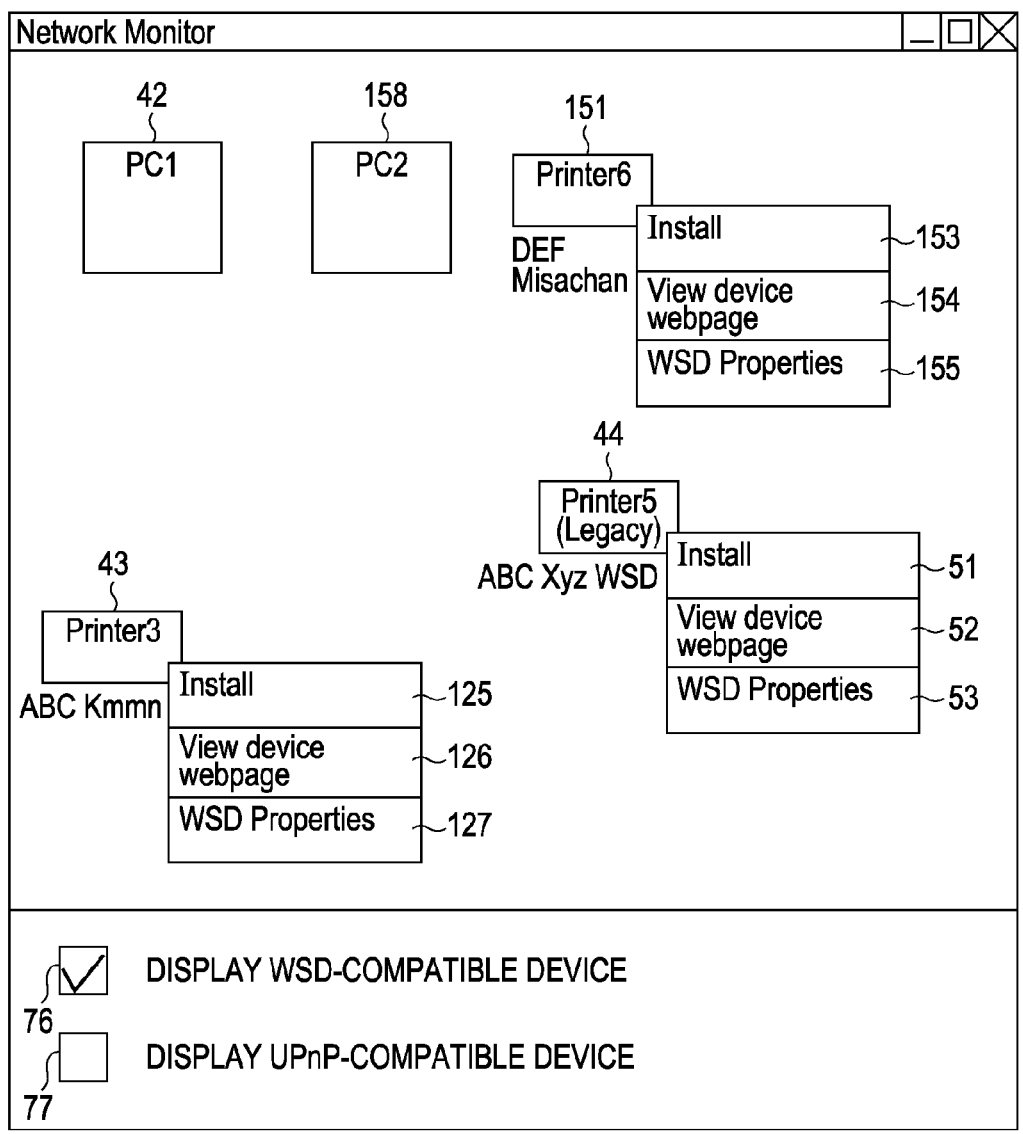
FIG. 28 illustrates a second example of the screen displayed by the network monitor according to the second exemplary embodiment of the present invention.

FIG. 28 illustrates a second example of the screen displayed by the network monitor 80. FIG. 28 illustrates a screen which is displayed in a case where the WSD-compatible device display check box 76 is ON and the UPnP-compatible device display check box 77 is OFF as being contrasted with the screen shown in FIG. 7.

FIG. 28 does not display the UPnP print menu 128, which was displayed when the icon 43 was selected by using the mouse and right click was performed in FIG. 7. This is because the processing in step S1913 of FIG. 24 is executed. In this manner, according to the present embodiment, for example, even in a case where filtering is performed and only the device corresponding to WSD is displayed, through the dynamic control, it is possible to display the menu, which was displayed through a static control in the related art. Therefore, it is possible to realize the peripheral apparatus control system provided with the appropriate user interface which does not cause the misunderstanding or confusion of the user with the improved user operability.

Figure 29:
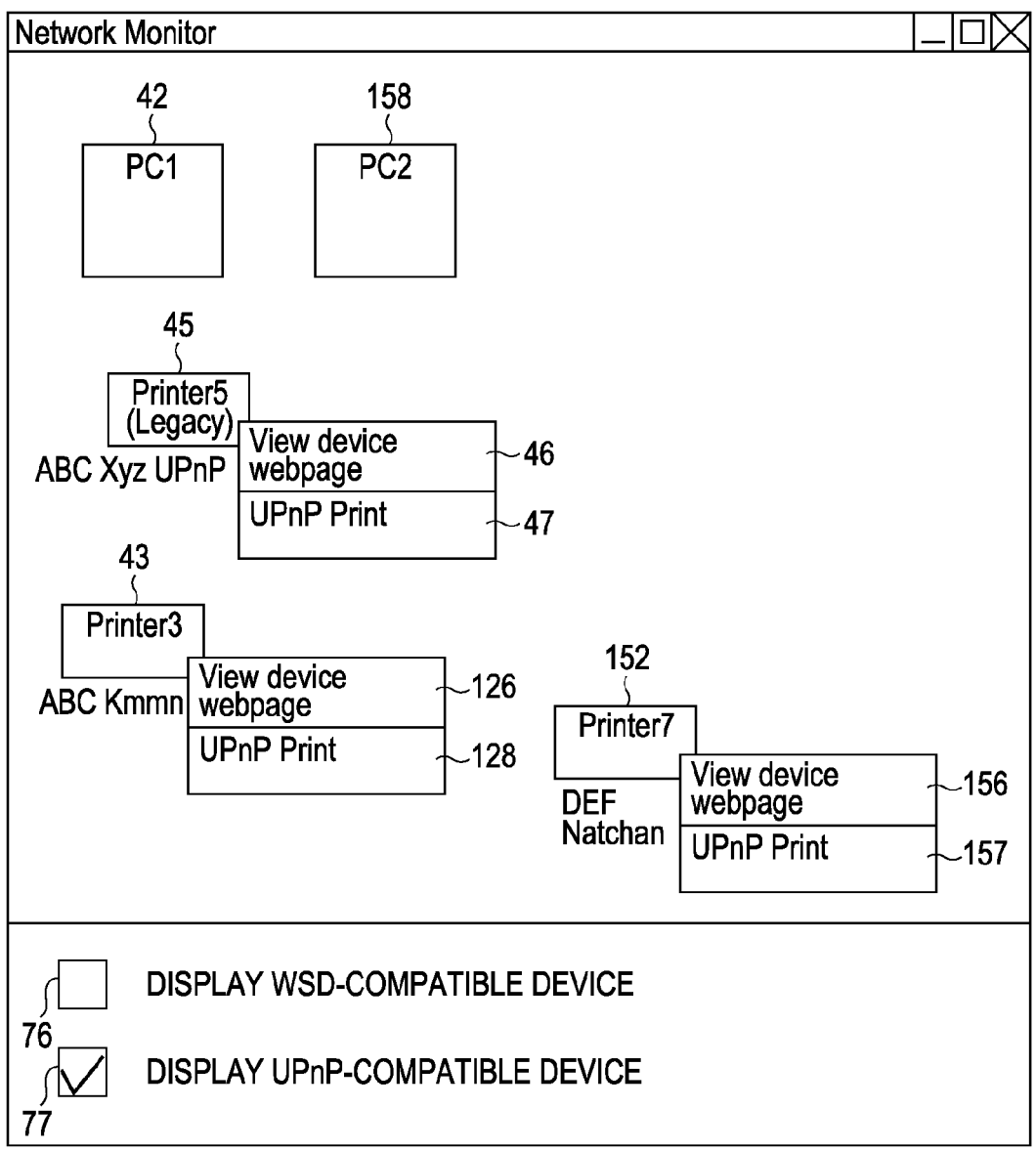
FIG. 29 illustrates a third example of the screen displayed by the network monitor according to the second exemplary embodiment of the present invention.

FIG. 29 illustrates a third example of the screen displayed by the network monitor 80. FIG. 29 illustrates a screen which is displayed in a case where the WSD-compatible device display check box 76 is OFF and the UPnP-compatible device display check box 77 is ON as being contrasted with the screen shown in FIG. 7.

FIG. 29 does not display the install menu 125 and the WSD property display menu 127, which were displayed when the icon 43 was selected by using the mouse and right click was performed. This is because the processing in step S1914 of FIG. 24 is executed. In this manner, according to the present embodiment, for example, even in a case where filtering is performed and only the device corresponding to UPnP is displayed, through the dynamic control, it is possible to display the menu, which was displayed through a static control in the related art. Therefore, it is possible to realize the peripheral apparatus control system provided with the appropriate user interface which does not cause the misunderstanding or confusion of the user with the improved user operability.

Figure 30:
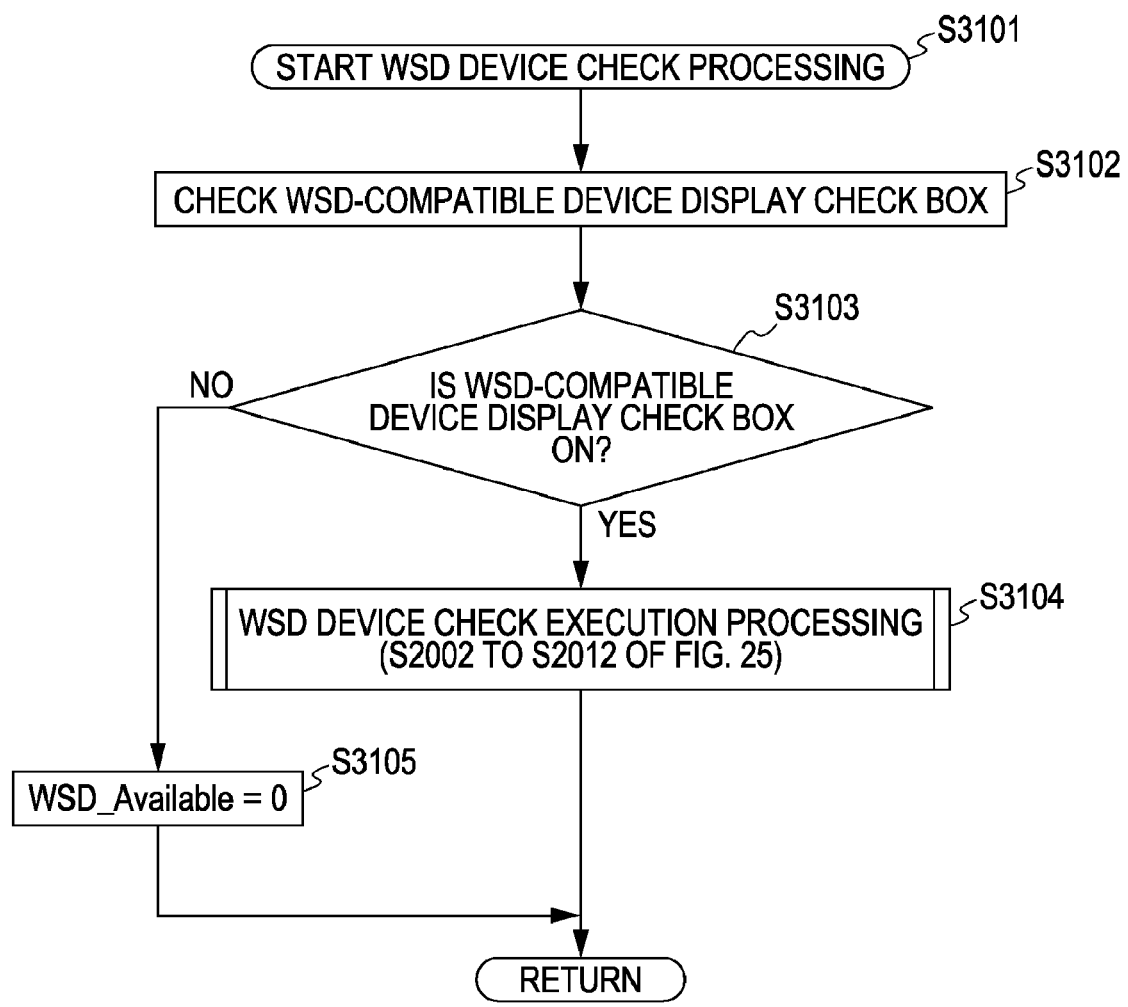
FIG. 30 is a flowchart for describing an example of a detail of a check processing for the device corresponding to WSD in step S1905 of FIG. 24 according to the second exemplary embodiment of the present invention.

FIG. 30 is a flowchart for describing an example of a detail of the checking processing for the device corresponding to WSD in step S1905 of FIG. 24.

In FIG. 30, when the checking processing for the device corresponding to WSD is started (step S3101), the PC 1 checks the WSD-compatible device display check box 76 (step S3102). Then, the PC 1 determines whether or not the WSD-compatible device display check box 76 is ON (step S3103), and as a result of this determination, in a case where the WSD-compatible device display check box 76 is ON, the PC 1 performs the WSD device check execution processing (step S3104). In this WSD device check execution processing, a processing in steps S2002 to S2012 of FIG. 25 is performed. Then, while returning back to the flowchart of FIG. 24, the processing in step S1906 of FIG. 24.

On the other hand, in step S3103, in a case where the WSD-compatible device display check box 76 is OFF, the PC 1 sets 0 in the variable WSD_Available (step S3105). Then, while returning back to the flowchart of FIG. 24, the processing in step S1906 of FIG. 24 is performed.

Figure 31:
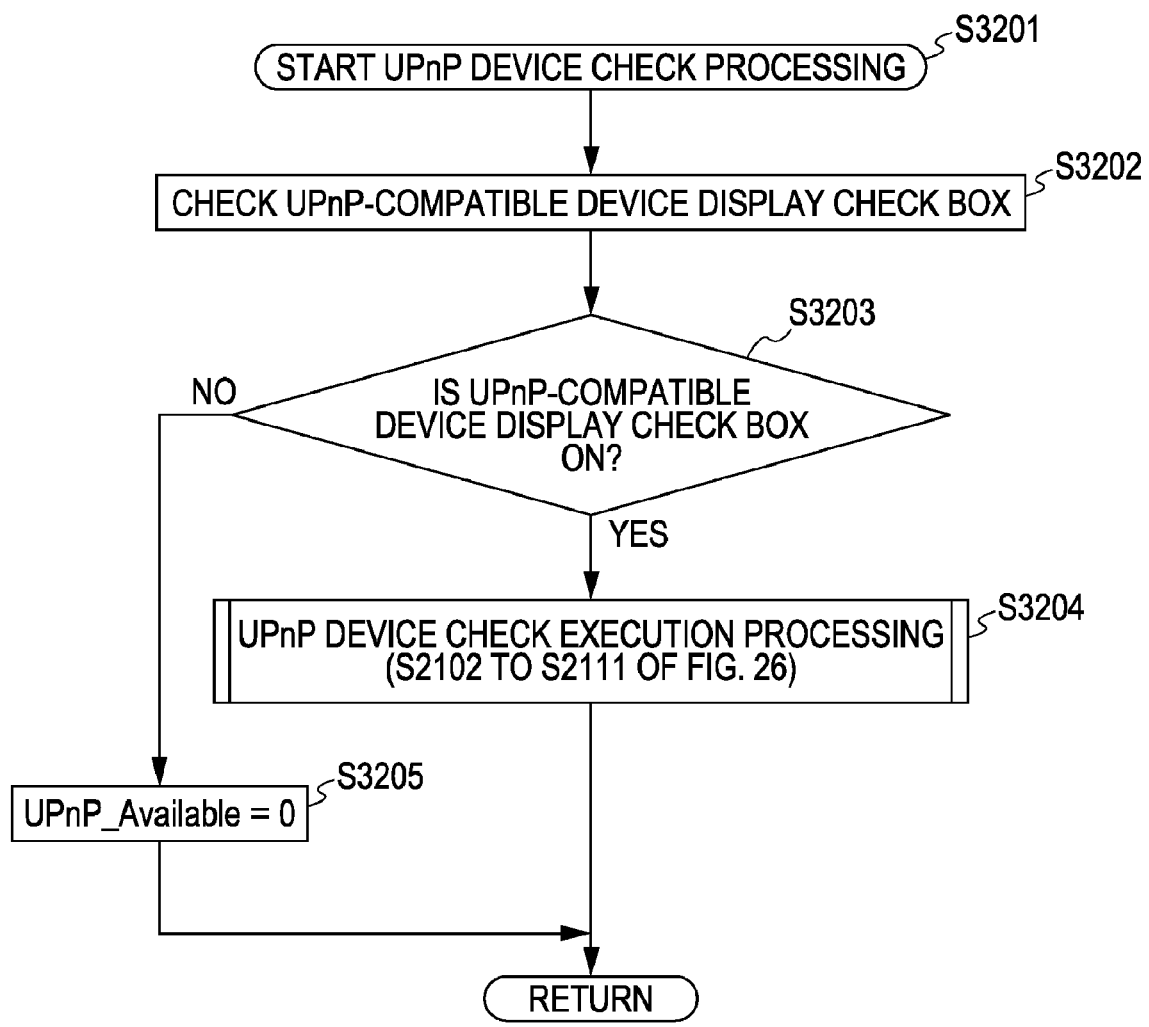
FIG. 31 is a flowchart for describing an example of a detail of the check processing for the device corresponding to the UPnP in step S1906 of FIG. 24 according to the second exemplary embodiment of the present invention.

FIG. 31 is a flowchart for describing an example of a detail of the checking processing for the device corresponding to UPnP in step S1906 of FIG. 24.

In FIG. 31, when the checking processing for the device corresponding to UPnP is started (step S3201), the PC 1 checks the UPnP-compatible device display check box 77 (step S3202). Then, the PC 1 determines whether or not the UPnP-compatible device display check box 77 is ON (step S3203). As a result of this determination, in a case where the UPnP-compatible device display check box 77 is ON, the PC 1 performs the UPnP device check execution processing (step S3204). In this UPnP device check processing, a processing in steps S2102 to S2111 of FIG. 26 is performed. Then, while returning back to the flowchart of FIG. 24, the processing in step S1907 of FIG. 24 is performed.

On the other hand, in step S3203, in a case where the UPnP-compatible device display check box 77 is OFF, the PC 1 sets 0 in the variable UPnP_Available (step S3205). Then, while returning back to the flowchart of FIG. 24, the processing in step S1906 of FIG. 24 is performed.

As described above, according to the present embodiment, for example, in a case where the WSD-compatible device display check box 76 and the UPnP-compatible device display check box 77 are OFF, in steps S3105 and S3205, 0 is set in the variable UPnP_Available. Then, by executing the flowchart of FIG. 24, through the execution of the display shown in FIGS. 27 to 29, the one example of the display unit is realized.

Hereinafter, an example of a data processing program that can be read out by the peripheral apparatus control system according to the above-described first and second embodiments will be described.

FIG. 32 illustrates an example of a memory map of the storage medium storing various processing programs that can be read out by the peripheral apparatus control system. It is noted that although not particularly illustrated, information for managing the program group stored in the storage medium, for example, version information, a creator, and the like, are also stored in this storage medium. Furthermore, information depending on the OS on the program reading side or the like, for example, the icons for displaying the programs in an identifying manner may also be stored in this storage medium.

In FIG. 32, a storage medium 130 is composed, for example, of hard disk. A directory information management unit 131 is configured to manage data depending on the various programs. A program storage unit 132 stores a program for installing various programs into the information processing apparatus, a program for decompressing a program when the program to be installed is compressed, and the like. The respective functions that can be realized by the executions of the respective flowcharts of FIGS. 23 to 26, 30, and 31 described according to the first and second embodiments may also be realized by a program externally installed. Then, in that case, the present invention is applied even in a case where an information group including the program is supplied to the PC or the peripheral apparatus by way of a storage medium including a CD-ROM, a flash memory, a flexible disk, or the like, or from the external storage medium via a network.

As described above, the embodiments of the present invention will be achieved when a storage medium recording a program code of software which realizes the functions of the above-described respective embodiments is supplied to a system or an apparatus. Then, the embodiments of the present invention will also be achieved when a computer of the system or the apparatus reads out and executes the program code stored in the storage medium. In this case, the program code read out from the storage medium itself realizes the novel functions of the present invention, and the storage medium storing the program code constitutes the present invention. As the storage medium for supplying the program code, for example, a flexible disk, a hard disk drive, an optical disk, an opto-magnetic disk, a CD-ROM, a CD-R, a magnet tape, a non-volatile memory card, a ROM, an EEPROM or the like can be used. Also, the functions of the above-described embodiments are realized by executing the program code read out by the computer. Furthermore, the present invention includes a case where a part or all of the actual process is performed by the OS or the like which is running on the computer on the basis of the instruction of the program code and the functions of the above-described embodiments are realized by the processing.

It is noted that according to the above-described respective embodiments, as an example of the application 80, the network monitor 80 shown in FIG. 6 is described, but the application 80 is not limited to the above. For example, an arbitrary application for installing a driver for the peripheral apparatus into the PC can also realize the same functions as the above-described application 80, and is effective.

In addition, according to the above-described respective embodiments, as an example of the peripheral apparatus (device), the color inkjet printer is described, but the peripheral apparatus (device) is not limited to the color inkjet printer. For example, an arbitrary printer such as a monochrome LBP, an MFP, and the like can be used as the peripheral apparatus (device). Furthermore, the peripheral apparatus (device) is not limited to the printer, and for example, any one of a copier, a facsimile, a scanner, a digital camera, and an apparatus provided with these multiple functions may be used as the peripheral apparatus (device).

In addition, according to the above-described respective embodiments, as the information processing apparatus, the personal computer (PC) is described, but the information processing apparatus is not limited to the above. For example, an arbitrary information processing apparatus (terminal) which can be used in a similar manner such as a DVD player, a game, a set top box, an internet home appliance, or the like can be used, and is effective.

In addition, according to the above-described respective embodiments, as the OS, the case of using the OS equivalent to Windows Vista® is described as an example. However, the OS is not limited to the above, and an arbitrary OS can be used.

In addition, according to the above-described respective embodiments, as the network 4, the case of using Ethernet is described as an example. However, the network 4 is not limited to the above, and another arbitrary network can be used. Furthermore, as the interface between the PCs 1 and 2 and the printers 3, and 5 to 7, the case of using Ethernet is described as an example. However, the interface is not limited to the above. For example, an arbitrary interface such as a wireless LAN, IEEE1394, or Bluetooth can be used.

In addition, according to the above-described respective embodiments, as an example of the web service protocol, WSD and UPnP are described, but the protocol is not limited to the above. For example, an arbitrary protocol such as an IHV unique protocol can be used.

In addition, according to the above-described respective embodiments, as the information set in the unique ID element, the MAC address is described as an example. However, the information set in the unique ID is not limited to the above. For example, arbitrary information with which the peripheral apparatus can be uniquely identified such as an IP address can be used as the information set in the unique ID.

According to the present embodiment, in a case where pieces of the identification information sent by using different protocols are identical with each other, the devices sending the pieces of the identification information are determined to be the same, and the information pieces related to the devices are integrated to be displayed on the display apparatus. Therefore, it is possible to facilitate the user to recognize the devices corresponding to the different protocols as the one device.

The information processing apparatus, the respective units constituting the device, and the respective steps of the device information display method according to the above-described embodiments of the present invention can be realized as the program stored in the RAM, the ROM, and the like of the computer. This program and the computer-readable recording medium which records the program are included in the present invention.

In addition, the present invention can also be realized, for example, as embodiments of a system, an apparatus, a method, a program, a computer-readable storage medium, or the like. To be more specific, the present invention may be applied to a system composed of a plurality of apparatuses, and in addition, may also be applied to an apparatus composed of one device.

It is noted that the present invention includes a case where the program of the software realizing the functions of the above-described embodiments (the program corresponding to the flowcharts shown in FIGS. 23 to 26, 30, and 31 according to the embodiments) is directly supplied to a system or an apparatus, and a case where the program is supplied remotely. Then, the present invention also includes a case where a computer of the system or the apparatus reads out and executes the supplied program code, the functions are achieved.

Therefore, in order to realize the function processing of the present invention by the computer, the program code installed into the computer itself also realizes the present invention. That is, the present invention also includes the computer the program itself for realizing the function processing of the present invention.

In that case, as long as the functions of the program are provided, such modes may be adopted including an object code, a program executed by an interpreter, script data supplied to the OS, and the like.

As the computer-readable recording medium for supplying the program, for example, a flexible disk, a hard disk drive, an optical disk, an opto-magnetic disk, an MO, a CD-ROM, a CD-R, a CD-RW, and the like may be used. Also, a magnetic tape, a non-volatile memory card, a ROM, a DVD (DVD-ROM, DVD-R), and the like may also be used.

Moreover, as a method of supplying the program, by using a browser of the client computer, a connection is made to a web site of the internet. Then, the program can also be supplied in such a manner that the computer program of the present invention itself or a compressed file including an automatic install function is downloaded from the web site onto a computer-readable recording medium such as a hard disk drive.

In addition, the program can also be supplied in such a manner that the program code constituting the program according to the embodiments of the present invention is divided into files, and the respective files are downloaded from different web sites. That is, a WWW server for allowing a plurality of users to download the program files for realizing the function processing of the present invention by the computer is also included in the present invention.

In addition, the program according to the embodiments of the present invention is encrypted, stored into a computer-readable storage medium such as a CD-ROM, and distributed to users, and then users who clear a predetermined condition are allowed to download key information for decrypting the encryption from a web site via the internet. Then, by using the downloaded key information, the encrypted program may be executed and installed into the computer to realize the functions of the embodiments.

In addition, as the computer executes the read out program, the functions of the above-described embodiments are realized. Moreover, a part or all of the actual process is performed by the OS or the like which is running on the computer on the basis of the instruction of the program code and the functions of the above-described embodiments may be realized by the processing.

Furthermore, in one embodiment, the program code read out from the computer-readable recording medium may be written in a memory that is provided to a function expansion board inserted in the computer or a function expansion unit connected to the computer. After that, on the basis of the instruction of the program code, a CPU or the like provided to the function expansion board or the function expansion unit may perform a part or all of the actual process. Through the processing, the functions of the above-described embodiments may be realized.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-000787 filed Jan. 7, 2008, and No. 2008-308910 filed Dec. 3, 2008 which are hereby incorporated by reference herein in their entirety.

What is claimed is:

1. An information processing apparatus, comprising:
a processor configured to execute at least one computer program, the at least one computer program comprising program code that when executed by the processor implements:
an obtaining unit configured to obtain messages sent by using different protocols from a device connected via a network, the messages including identification information about the device;
a determination unit configured to determine whether pieces of the identification information included in each of the messages obtained by the obtaining unit are identical;
an integration unit configured to integrate, when the determination unit determines that the pieces of the identification information included in each of the messages obtained by the obtaining unit are identical, information related to the device which sent the messages using the different protocols; and a display control unit configured to control the display of the integrated information on a display apparatus as information about one WSD-compatible device.

2. The information processing apparatus according to claim 1, wherein the program code when executed by the processor further implements a second obtaining unit configured to obtain use availability information sent from the device connected via the network which indicates whether or not the device can be used,
wherein the display control unit further controls displaying, when the use availability information obtained by the second obtaining unit indicates that use of the device is permitted, the integrated information related to the device on the display apparatus as information about one WSD-compatible device.

3. The information processing apparatus according to claim 1, wherein the integration unit integrates operation menus as the integrated information related to the device.

4. The information processing apparatus according to claim 1, wherein the program code when executed by the processor further implements a third obtaining unit configured to obtain name information of the device from the device connected via the network,
wherein the third obtaining unit obtains name information different for each protocol dealt with by the device from the device which does not send messages including the identification information.

5. A device information display method implemented by at least one computer program that is executed by a processor, the method comprising:
obtaining messages sent by using different protocols from a device connected via a network, the messages including identification information about the device;
determining whether pieces of the identification information included in each of the obtained messages are identical;
integrating, when it is determined that pieces of the identification information included in each of the obtained messages are identical, information related to the device which sent the messages using the different protocols; and
controlling display of the integrated information as information about one WSD-compatible device.

6. The device information display method according to claim 5, further comprising obtaining use availability information sent from the device connected via the network which indicates whether or not the device can be used,
wherein controlling display of the integrated information, when the obtained use availability information indicates that use of the device is permitted, controls display of the integrated information related to the device as information about one WSD-compatible device.

7. The device information display method according to claim 5, wherein integrating includes integrating operation menus as the information related to the device.

8. The device information display method according to claim 5, further comprising obtaining name information of the device from the device connected via the network,
wherein obtaining the name information includes obtaining name information different for each protocol dealt with by the device from the device which does not send messages including the identification information.

9. A non-transitory computer-readable storage medium storing a control program for instructing a computer to execute a device information display method, the method comprising:
obtaining messages sent by using different protocols from a device connected via a network, the messages including identification information about the device;
determining whether pieces of the identification information included in each of the obtained messages are identical
integrating, when it is determined that the pieces of identification information included in each of the obtained messages are identical, information related to the device which sent the messages by using the different protocols; and
controlling display of the integrated information as information about one WSD-compatible device.

10. An information processing apparatus, comprising:
a processor configured to execute at least one computer program, the at least one computer program comprising program code that when executed by the processor implements:
an obtaining unit configured to obtain messages sent by using different protocols from a device connected via a network, the messages including identification information about the device;
a determination unit configured to determine whether pieces of the identification information included in each of the messages obtained by the obtaining unit are identical; and
an integration unit configured to, when the determination unit determines that the pieces of identification information included in each of the messages obtained by the obtaining unit are identical, integrate information related to the device which sent the messages by using the different protocols; and
a display unit configured to control displaying of the integrated information on a display apparatus as information about one device.

11. The information processing apparatus according to claim 10, wherein the display unit controls displaying of information related to the device as information about one device corresponding to a protocol selected by a user among the different protocols.

* * * * *